US012559701B2

(12) United States Patent
Sivik et al.

(10) Patent No.: US 12,559,701 B2
(45) **Date of Patent: *Feb. 24, 2026**

(54) LAUNDRY CARE OR DISH CARE COMPOSITION COMPRISING A POLY ALPHA-1,6-GLUCAN DERIVATIVE

(71) Applicant: The Procter & Gamble Company, Cincinnati, OH (US)

(72) Inventors: Mark Robert Sivik, Mason, OH (US); Kristine Lynn Fliter, Harrison, OH (US); Neil Thomas Fairweather, Liberty Township, OH (US); Gang Si, Newcastle upon Tyne (GB); David Good, Loveland, OH (US); Zheng-Zheng Huang, Hockessin, DE (US); Helen Lu, Wallingford, PA (US); Douglas Adelman, Wilmington, DE (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/608,990

(22) Filed: Mar. 19, 2024

(65) Prior Publication Data

US 2024/0228911 A1 Jul. 11, 2024

Related U.S. Application Data

(63) Continuation of application No. 17/342,574, filed on Jun. 9, 2021, now Pat. No. 11,965,147.

(60) Provisional application No. 63/037,010, filed on Jun. 10, 2020.

(30) Foreign Application Priority Data

Jun. 16, 2020 (EP) .................................... 20180305

(51) Int. Cl.

| | |
|---|---|
| ***C11D 3/22*** | (2006.01) |
| ***C08L 5/00*** | (2006.01) |
| ***C11D 3/386*** | (2006.01) |
| *C08B 37/00* | (2006.01) |

(52) U.S. Cl.

CPC .............. *C11D 3/223* (2013.01); *C11D 3/386* (2013.01); *C08B 37/0009* (2013.01); *C11D 2111/12* (2024.01); *C11D 2111/16* (2024.01); *C11D 2111/18* (2024.01)

(58) Field of Classification Search

CPC ........... C11D 3/22; C11D 3/223; C11D 3/227; C11D 3/228; C11D 3/386; C11D 7/268; C08B 37/0009; C08L 5/00

See application file for complete search history.

(56) References Cited

U.S. PATENT DOCUMENTS

| | | | |
|---|---|---|---|
| 1,130,271 | A | 3/1915 | Hammond |
| 2,251,283 | A | 8/1941 | Johnson |
| 2,474,523 | A | 6/1949 | Reynolds |
| 2,745,589 | A | 5/1956 | Daly |
| 2,777,630 | A | 1/1957 | Moberger |
| 2,836,343 | A | 5/1958 | Theodore |
| 3,116,007 | A | 12/1963 | D'Esposito et al. |
| 3,366,496 | A | 1/1968 | Bomar et al. |
| RE26,557 | E | 3/1969 | Houston |
| 3,512,699 | A | 5/1970 | Wilson |

(Continued)

FOREIGN PATENT DOCUMENTS

| | | | |
|---|---|---|---|
| AT | 334276 | B | 1/1976 |
| CH | 710519 | A2 | 6/2016 |

(Continued)

OTHER PUBLICATIONS

All Office Actions, U.S. Appl. No. 16/988,767, filed Aug. 10, 2020.

(Continued)

*Primary Examiner* — Brian P Mruk

(74) *Attorney, Agent, or Firm* — Carolyn S. Powell; George H. Leal

(57) ABSTRACT

A laundry care or dish care composition can include a poly alpha-1,6-glucan derivative, wherein the poly alpha-1,6-glucan derivative includes:

(i) a poly alpha-1,6-glucan backbone of glucose monomer units, wherein greater than or equal to 80% of the glucose monomer units are linked via alpha-1,6 glycosidic linkages, and wherein from about 10% or less of the glucose monomer units are linked via alpha-1,3 glycosidic linkages, 1,2 glycosidic linkages, and/or 1,4 glycosidic linkages; and (ii) at least one organic group linked to the poly alpha-1,6-glucan backbone through a

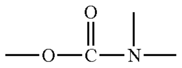

linkage moiety;

wherein, the poly alpha-1,6-glucan backbone has a weight average degree of polymerization of at least about 5;

wherein, the poly alpha-1,6-glucan derivative has a degree of substitution of

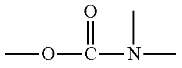

linkage moiety of from about 0.20 to about 1.00.

13 Claims, No Drawings

(56) References Cited

U.S. PATENT DOCUMENTS

| | | | | |
|---|---|---|---|---|
| 4,053,100 | A | 10/1977 | Baptist | |
| 4,083,455 | A | 4/1978 | Keating, Jr. | |
| 4,235,735 | A | 11/1980 | Harris et al. | |
| 4,304,355 | A | 12/1981 | Sykora | |
| 4,441,648 | A | 4/1984 | Portsmouth | |
| 4,834,255 | A | 5/1989 | Boots | |
| 5,040,722 | A | 8/1991 | Fromion | |
| 5,103,972 | A | 4/1992 | Ackeret | |
| 5,161,734 | A | 11/1992 | Ruehl et al. | |
| 5,299,732 | A | 4/1994 | Armor et al. | |
| 5,439,133 | A | 8/1995 | Stone | |
| 5,505,374 | A | 4/1996 | Stone | |
| 5,515,996 | A | 5/1996 | Stone | |
| 5,518,172 | A | 5/1996 | Nanno | |
| 5,551,938 | A | 9/1996 | Stone | |
| 5,627,150 | A | 5/1997 | Peterson et al. | |
| 5,725,144 | A | 3/1998 | Stone et al. | |
| 6,604,676 | B2 | 8/2003 | Giblin | |
| 6,672,474 | B2 | 1/2004 | May et al. | |
| D499,022 | S | 11/2004 | Sun | |
| 6,905,694 | B1 | 6/2005 | Modi | |
| 7,377,385 | B2 | 5/2008 | Giannini et al. | |
| 7,726,552 | B2 | 6/2010 | Chadima | |
| 7,829,599 | B2 | 11/2010 | Stevens et al. | |
| 7,854,771 | B2 | 12/2010 | Boutique | |
| 8,443,978 | B2 | 5/2013 | Royer | |
| 8,746,444 | B2 | 6/2014 | Dehlin | |
| 8,997,979 | B2 | 4/2015 | Ghini | |
| 9,475,605 | B2 | 10/2016 | Everett | |
| 9,771,548 | B2 | 9/2017 | Nagy et al. | |
| 9,783,335 | B2 | 10/2017 | Everett | |
| 10,017,291 | B2 | 7/2018 | Smith | |
| 10,232,976 | B2 | 3/2019 | Waddington | |
| 10,442,600 | B2 | 10/2019 | Waltermire et al. | |
| 10,486,849 | B2 | 11/2019 | Parkes | |
| 10,822,383 | B2 | 11/2020 | Cheng et al. | |
| 10,844,142 | B2 | 11/2020 | Lu et al. | |
| D921,982 | S | 6/2021 | Gerhards et al. | |
| 11,028,187 | B2 | 6/2021 | Lu et al. | |
| 11,046,476 | B2 | 6/2021 | Whitehurst | |
| 11,066,626 | B2 | 7/2021 | Huang et al. | |
| 11,674,034 | B2 | 6/2023 | Lenges et al. | |
| 11,732,216 | B2 * | 8/2023 | Sivik | C11D 3/223<br>510/470 |
| 11,965,147 | B2 * | 4/2024 | Sivik | C11D 3/227 |
| 2002/0052302 | A1 | 5/2002 | Clark et al. | |
| 2003/0111523 | A1 | 6/2003 | Haugan | |
| 2003/0222130 | A1 | 12/2003 | Fukushima et al. | |
| 2006/0118451 | A1 | 6/2006 | Edwards | |
| 2007/0225191 | A1 | 9/2007 | Scheibel et al. | |
| 2008/0054059 | A1 | 3/2008 | Chadima | |
| 2008/0265010 | A1 | 10/2008 | Montague | |
| 2009/0032575 | A1 | 2/2009 | D'Amato | |
| 2011/0204087 | A1 | 8/2011 | Kopulos et al. | |
| 2014/0179913 | A1 | 6/2014 | Paullin et al. | |
| 2014/0187766 | A1 | 7/2014 | Kasat et al. | |
| 2015/0232785 | A1 | 8/2015 | Paullin et al. | |
| 2015/0259439 | A1 | 9/2015 | Nambiar et al. | |
| 2015/0267155 | A1 | 9/2015 | Brooker et al. | |
| 2015/0368594 | A1 | 12/2015 | Nagy et al. | |
| 2016/0122445 | A1 | 5/2016 | Nambiar et al. | |
| 2016/0311935 | A1 | 10/2016 | Dennes et al. | |
| 2017/0001752 | A1 | 1/2017 | Ishikawa et al. | |
| 2017/0036808 | A1 | 2/2017 | Everett | |
| 2017/0298308 | A1 | 10/2017 | Labeque et al. | |
| 2018/0022498 | A1 | 1/2018 | Everett | |
| 2018/0257827 | A1 | 9/2018 | Drosos | |
| 2018/0265816 | A1 | 9/2018 | Lintula | |
| 2018/0346846 | A1 | 12/2018 | Kropf et al. | |
| 2019/0023448 | A1 | 1/2019 | Mehta | |
| 2019/0062023 | A1 | 2/2019 | Lantz | |
| 2019/0135503 | A1 | 5/2019 | De Wilde | |
| 2019/0136153 | A1 | 5/2019 | Dicosimo et al. | |
| 2019/0185893 | A1 | 6/2019 | Guan et al. | |
| 2019/0202942 | A1 | 7/2019 | Lu et al. | |
| 2019/0225737 | A1 | 7/2019 | Behabtu et al. | |
| 2019/0291917 | A1 | 9/2019 | Curcic | |
| 2019/0309096 | A1 | 10/2019 | Lu et al. | |
| 2019/0345267 | A1 | 11/2019 | Adelman et al. | |
| 2019/0390138 | A1 | 12/2019 | Sivik et al. | |
| 2020/0002646 | A1 | 1/2020 | Huang et al. | |
| 2020/0131281 | A1 | 4/2020 | Guan et al. | |
| 2020/0308371 | A1 | 10/2020 | Briegel et al. | |
| 2021/0047072 | A1 | 2/2021 | Ng Pak Leung et al. | |
| 2021/0071217 | A1 | 3/2021 | Paullin et al. | |
| 2021/0388289 | A1 | 12/2021 | Sivik et al. | |
| 2021/0395655 | A1 | 12/2021 | Depoot et al. | |
| 2022/0282071 | A1 | 9/2022 | Behabtu et al. | |
| 2023/0106704 | A1 | 4/2023 | Si et al. | |
| 2023/0116102 | A1 | 4/2023 | Sivik et al. | |
| 2023/0116339 | A1 | 4/2023 | Sivik et al. | |
| 2023/0212325 | A1 | 7/2023 | Huang et al. | |
| 2023/0287148 | A1 | 9/2023 | Huang et al. | |

FOREIGN PATENT DOCUMENTS

| | | | | |
|---|---|---|---|---|
| CN | 102634033 | A | 8/2012 | |
| CN | 105481988 | A | 4/2016 | |
| DE | 9214914 | U1 | 1/1993 | |
| EP | 0157365 | A2 | 10/1985 | |
| EP | 0571711 | A2 | 12/1993 | |
| EP | 1783058 | A1 | 5/2007 | |
| EP | 3587293 | A1 | 1/2020 | |
| EP | 3753856 | A1 | 12/2020 | |
| FR | 2820718 | A1 | 8/2002 | |
| JP | 2001172678 | A | 6/2001 | |
| JP | 2018076095 | A | 4/2010 | |
| JP | 4536881 | B2 | 12/2018 | |
| WO | 2008038189 | A1 | 4/2008 | |
| WO | 2010085471 | A1 | 7/2010 | |
| WO | 2011012863 | A1 | 2/2011 | |
| WO | 2015095358 | A1 | 6/2015 | |
| WO | 2018112187 | A1 | 6/2018 | |
| WO | WO 2018/112187 | * | 6/2018 | C08B 37/00 |
| WO | 2019164669 | A1 | 8/2019 | |
| WO | 2019243071 | A1 | 12/2019 | |
| WO | 2020131711 | A1 | 6/2020 | |

OTHER PUBLICATIONS

All Office Actions; U.S. Appl. No. 17/313,060, filed May 6, 2021.
All Office Actions; U.S. Appl. No. 17/342,574, filed Jun. 9, 2021.
All Office Actions; U.S. Appl. No. 17/342,576, filed Jun. 9, 2021.
All Office Actions; U.S. Appl. No. 17/342,577, filed Jun. 9, 2021.
All Office Actions; U.S. Appl. No. 17/365,480, filed Jul. 1, 2021.
All Office Actions; U.S. Appl. No. 17/475,371, filed Sep. 15, 2021.
All Office Actions; U.S. Appl. No. 18/337,813, filed Jun. 20, 2023.
Bao X et al., "Chemical Modifications of the (1-3)-a-d-glucan from spores of Ganoderma lucidum and investigation of their physiocochemical properties and immunological activity", Carbohydrate Rese Pergamon, GB, vol. 336, No. 2, dated Nov. 8, 2021, pp. 127-140, XP004311616, ISSN: 0008-6215.
EPO Search Report and Opinion; Application No. 20180305.3 ; dated Oct. 6, 2020; 7 pages.
PCT Search Report and Written Opinion for PCT/US2021/036508 dated Nov. 18, 2021.
https://www.youtube.com/watch?v=06TdcfRR95s, pp. 3-7.
Perfumery, Practice and Principles, by Calkin and Jellinek, pub'd 1994, pp. 173-174.
Photograph of adhesive fragrance strip in Persil 3-in-1 plastic tub, 2 pages.
Siqi L Schffler et al., "Phytoglycogen Octenyl Succinate, an Amphiphilic Carbohydrate Nanoparticle and [epsilon]-Polylysine to improve Lipid oxidative stability of emulsions", Journal of agricultural and food Chemistry, vol. 58, No. 1, dated Jan. 13, 2010, pp. 660-667, XP55458256, ISSN: 0021-8561.

* cited by examiner

LAUNDRY CARE OR DISH CARE COMPOSITION COMPRISING A POLY ALPHA-1,6-GLUCAN DERIVATIVE

This application is a continuation of Ser. No. 17/342,574, filed on Jun. 9, 2021, now U.S. Pat. No. 11,965,147, which claims benefit of Provisional Ser. No. 63/037,010, filed on Jun. 10, 2020.

FIELD OF THE INVENTION

The present invention is directed towards poly alpha-1,6-glucan derivatives comprising poly alpha-1,6-glucan substituted with at least one organic group. The organic group linked to the poly alpha-1,6-glucan through a

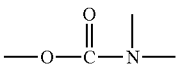

linkage moiety. The poly alpha-1,6-glucan comprises a backbone of glucose monomer units wherein greater than or equal to 40% of the glucose monomer units are linked via alpha-1,6 glycosidic linkages, and optionally at least 5% of the backbone glucose monomer units have branches via alpha-1,2 and/or alpha-1,3 glycosidic linkages.

BACKGROUND OF THE INVENTION

Polysaccharides modified with ether groups may be used for aqueous applications such as rheology modifiers, emulsion stabilizers, and dispersing agents in cleaning, detergent, cosmetics, food, cement, film, and paper production. For example, carboxymethyl cellulose derivatives have been used as rheology modifiers. Enzymatically-polymerized polysaccharides and their derivatives can have narrow polydispersity and compositional consistency, offering advantages in some applications. Ether derivatives of poly alpha-1,3-1,6-glucan and methods of using such materials as viscosity modifiers are disclosed in published patent application US 2015/0232785. Hydrocolloids and aqueous solutions comprising a poly alpha-1,3-glucan ether compound and such materials in the form of a personal care product, pharmaceutical product, food product, household product, or industrial product, are disclosed in U.S. Pat. No. 10,005,850. The pattern of glycosidic linkages in the glucan polymer backbone, in combination with selected substituents on the ether compound and the degree of substitution, can affect the solubility or dispersibility of the glucan ether compound in aqueous solution.

There is a continuing need for new materials which can be used in aqueous applications such as laundry and dish care, for example as stain removal, anti-deposition, anti-graying, and/or whiteness performing agents in laundry detergents, and in dish care applications. There remains a need for such materials which can be made from renewable resources and which are biodegradable.

US 2020/002646 and US 2018/346846 relate to compositions comprising polysaccharide derivatives.

SUMMARY OF THE INVENTION

The present invention provides a laundry care or dish care composition comprising a poly alpha-1,6-glucan derivative, wherein the poly alpha-1,6-glucan derivative comprises:

(i) a poly alpha-1,6-glucan backbone of glucose monomer units, wherein greater than or equal to 40% of the glucose monomer units are linked via alpha-1,6 glycosidic linkages, and wherein from 0% to less than 30% of the glucose monomer units are linked via alpha-1,3 glycosidic linkages, and optionally at least 5% of the backbone glucose monomer units have branches via alpha-1,2 and/or alpha-1,3 glycosidic linkages.

(ii) at least one organic group linked to the poly alpha-1,6-glucan backbone through a

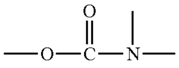

linkage moiety;

wherein, the poly alpha-1,6-glucan backbone has a weight average degree of polymerization of at least 5; and wherein, the poly alpha-1,6-glucan derivative has a degree of substitution of

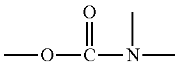

linkage moiety of from 0.001 to 3.00.

DETAILED DESCRIPTION OF THE INVENTION

The disclosures of all cited patent and non-patent literature are incorporated herein by reference in their entirety.

As used herein, the term "embodiment" or "disclosure" is not meant to be limiting, but applies generally to any of the embodiments defined in the claims or described herein. These terms are used interchangeably herein.

In this disclosure, a number of terms and abbreviations are used. The following definitions apply unless specifically stated otherwise.

The articles "a", "an", and "the" preceding an element or component are intended to be nonrestrictive regarding the number of instances (i.e. occurrences) of the element or component. These articles should be read to include one or at least one, and the singular word form of the element or component also includes the plural unless the number is obviously meant to be singular.

The term "comprising" means the presence of the stated features, integers, steps, or components as referred to in the claims, but that it does not preclude the presence or addition of one or more other features, integers, steps, components, or groups thereof. The term "comprising" is intended to include embodiments encompassed by the terms "consisting essentially of" and "consisting of". Similarly, the term "consisting essentially of" is intended to include embodiments encompassed by the term "consisting of".

Where present, all ranges are inclusive and combinable. For example, when a range of "1 to 5" is recited, the recited range should be construed as including ranges "1 to 4", "1 to 3", 1-2", "1-2 and 4-5", "1-3 and 5", and the like.

As used herein in connection with a numerical value, the term "about" refers to a range of +/−0.5 of the numerical value, unless the term is otherwise specifically defined in context. For instance, the phrase a "pH value of about 6" refers to pH values of from 5.5 to 6.5, unless the pH value is specifically defined otherwise.

It is intended that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

The use of numerical values in the various ranges specified in this application, unless expressly indicated otherwise, are stated as approximations as though the minimum and maximum values within the stated ranges were both proceeded by the word "about". In this manner, slight variations above and below the stated ranges can be used to achieve substantially the same results as values within the ranges. Also, the disclosure of these ranges is intended as a continuous range including each and every value between the minimum and maximum values.

The features and advantages of the present disclosure will be more readily understood, by those of ordinary skill in the art from reading the following detailed description. It is to be appreciated that certain features of the disclosure, which are, for clarity, described above and below in the context of separate embodiments, may also be provided in combination in a single element. Conversely, various features of the disclosure that are, for brevity, described in the context of a single embodiment, may also be provided separately or in any sub-combination. In addition, references to the singular may also include the plural (for example, "a" and "an" may refer to one or more) unless the context specifically states otherwise.

As used herein:

The term "polysaccharide" means a polymeric carbohydrate molecule composed of long chains of monosaccharide units bound together by glycosidic linkages and on hydrolysis gives the constituent monosaccharides or oligosaccharides.

The terms "poly alpha-1,6-glucan", "alpha-1,6-glucan", "dextran", "dextran polymer" and the like herein refer to an alpha-glucan comprising at least 40% alpha-1,6 glycosidic linkages.

The terms "percent by weight", "weight percentage (wt %)" and "weight-weight percentage (% w/w)" are used interchangeably herein. Percent by weight refers to the percentage of a material on a mass basis as it is comprised in a composition, mixture or solution.

The phrase "water insoluble" means that less than 1 gram of the polysaccharide or polysaccharide derivative dissolves in 1000 milliliters of water at 23° C.

The term "water soluble" means that the polysaccharide or polysaccharide derivative is soluble at 1% by weight or higher in pH 7 water at 25° C. The percentage by weight is based on the total weight of the polysaccharide soluble in water, for example, 1 gram of polysaccharide in 100 grams of water.

The term "hydrophobic" refers to a molecule or substituent which is nonpolar and has little or no affinity for water, and which tends to repel water.

The term "molar substitution" (M.S.) as used herein refers to the moles of a organic group per monomeric unit of the polysaccharide or the derivative thereof. It is noted that the molar substitution value for a poly alpha-1,6-glucan derivative, for example, may have a very high upper limit, for example in the hundreds or even thousands. For example, if the organic group is a hydroxyl-containing alkyl group, via the addition of ethylene oxide to one of the hydroxyl groups of the poly alpha-1,6-glucan, then the so-formed hydroxyl group from the ethylene oxide can then be further etherified to form a polyether.

The molecular weight of a polysaccharide or polysaccharide derivative can be represented as statistically averaged molecular mass distribution, i.e. as number-average molecular weight ($M_n$) or as weight-average molecular weight ($M_w$), both of which are generally given in units of Daltons (Da), i.e. in grams/mole. Alternatively, molecular weight can be represented as DPw (weight average degree of polymerization) or DPn (number average degree of polymerization). Various means are known in the art for calculating these molecular weights from techniques such as high-pressure liquid chromatography (HPLC), size exclusion chromatography (SEC), gel permeation chromatography (GPC), and gel filtration chromatography (GFC).

As used herein, "weight average molecular weight" or "$M_w$" is calculated as $M_w=\Sigma N_i M_i^2/\Sigma N_i M_i$; where $M_i$ is the molecular weight of an individual chain i and $N_i$ is the number of chains of that molecular weight. In addition to using SEC, the weight average molecular weight can be determined by other techniques such as static light scattering, mass spectrometry especially MALDI-TOF (matrix-assisted laser desorption/ionization time-of-flight), small angle X-ray or neutron scattering, and ultracentrifugation.

As used herein, "number average molecular weight" or "$M_n$" refers to the statistical average molecular weight of all the polymer chains in a sample. The number average molecular weight is calculated as $M_n=\Sigma N_i M_i/\Sigma N_i$ where $M_i$ is the molecular weight of a chain i and $N_i$ is the number of chains of that molecular weight. In addition to using SEC, the number average molecular weight of a polymer can be determined by various colligative methods such as vapor pressure osmometry or end-group determination by spectroscopic methods such as proton NMR, FTIR, or UV-vis.

As used herein, number average degree of polymerization (DPn) and weight average degree of polymerization (DPw) are calculated from the corresponding average molecular weights Mw or Mn by dividing by the molar mass of one monomer unit $M_1$. In the case of unsubstituted glucan polymer, $M_1=162$. In the case of a substituted glucan polymer, $M_1=162+M_f \times DOS$, where $M_f$ is the molar mass of the substituent group and DoS is the degree of substitution with respect to that substituent group (average number of substituted groups per one glucose unit).

Glucose carbon positions 1, 2, 3, 4, 5 and 6 as referred to herein are as known in the art and depicted in Structure I:

Structure I

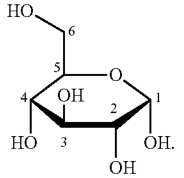

The terms "glycosidic linkage" and "glycosidic bond" are used interchangeably herein and refer to the type of covalent bond that joins a carbohydrate (sugar) molecule to another group such as another carbohydrate. The term "alpha-1,6-glucosidic linkage" as used herein refers to the covalent bond that joins alpha-D-glucose molecules to each other through carbons 1 and 6 on adjacent alpha-D-glucose rings. The term “alpha-1,3-glucosidic linkage” as used herein refers to the covalent bond that joins alpha-D-glucose molecules to each other through carbons 1 and 3 on adjacent alpha-D-glucose rings. The term “alpha-1,2-glucosidic linkage” as used herein refers to the covalent bond that joins alpha-D-glucose molecules to each other through carbons 1 and 2 on adjacent alpha-D-glucose rings.

The term “alpha-1,4-glucosidic linkage” as used herein refers to the covalent bond that joins alpha-D-glucose molecules to each other through carbons 1 and 4 on adjacent alpha-D-glucose rings. Herein, “alpha-D-glucose” will be referred to as “glucose”.

The glycosidic linkage profile of a glucan, dextran, substituted glucan, or substituted dextran can be determined using any method known in the art. For example, a linkage profile can be determined using methods that use nuclear magnetic resonance (NMR) spectroscopy (e.g., $^{13}C$ NMR or $^{1}H$ NMR). These and other methods that can be used are disclosed in *Food Carbohydrates: Chemistry, Physical Properties, and Applications* (S. W. Cui, Ed., Chapter 3, S. W. Cui, Structural Analysis of Polysaccharides, Taylor & Francis Group LLC, Boca Raton, FL, 2005), which is incorporated herein by reference.

The structure and molecular weight of a polysaccharide or polysaccharide derivative can be determined based on the reactants and confirmed by various physiochemical analyses known in the art to include but not limited to multiangle light scattering diffraction mass spec (MALDI) and size exclusion chromatography (SEC). Degree of substitution of a polysaccharide or polysaccharide derivative can be determined by various physiochemical analyses known in the art to include but not limited to NMR spectroscopy and chemical digest methods.

The present invention provides a laundry care or dish care composition comprising a poly alpha-1,6-glucan derivative, wherein the poly alpha-1,6-glucan derivative comprises:

(i) a poly alpha-1,6-glucan backbone of glucose monomer units, wherein greater than or equal to 40% of the glucose monomer units are linked via alpha-1,6 glycosidic linkages, and wherein from 0% to less than 30% of the glucose monomer units are linked via alpha-1,3 glycosidic linkages, and optionally at least 5% of the backbone glucose monomer units have branches via alpha-1,2 and/or alpha-1,3 glycosidic linkages; and (ii) at least one organic group linked to the poly alpha-1,6-glucan backbone through a

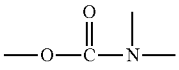

linkage moiety;

wherein, the poly alpha-1,6-glucan backbone has a weight average degree of polymerization of at least 5; and wherein, the poly alpha-1,6-glucan derivative has a degree of substitution of

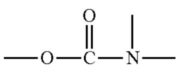

linkage moiety of from 0.001 to 3.00.

The poly alpha-1,6-glucan derivative comprises:

(i) a poly alpha-1,6-glucan backbone of glucose monomer units, wherein greater than or equal to 40% of the glucose monomer units are linked via alpha-1,6 glycosidic linkages, and wherein from 0% to less than 30% of the glucose monomer units are linked via alpha-1,3 glycosidic linkages, and optionally at least 5% of the backbone glucose monomer units have branches via alpha-1,2 and/or alpha-1,3 glycosidic linkages; and (ii) at least one organic group linked to the poly alpha-1,6-glucan backbone through a

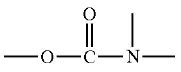

linkage moiety;

wherein, the poly alpha-1,6-glucan backbone has a weight average degree of polymerization of at least 5; and wherein, the poly alpha-1,6-glucan derivative has a degree of substitution of

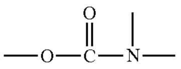

linkage moiety of from 0.001 to 3.00.

The poly alpha-1,6-glucan derivatives disclosed herein comprise water-soluble poly alpha-1,6-glucan comprising a backbone of glucose monomer units wherein greater than or equal to 40% of the glucose monomer units are linked via alpha-1,6-glycosidic linkages, and wherein from 0% to less than 30% of the glucose monomer units are linked via alpha-1,3 glycosidic linkages, and optionally at least 5% of the backbone glucose monomer units have branches via alpha-1,2 and/or alpha-1,3-glycosidic linkages.

Typically, the poly alpha-1,6-glucan being randomly substituted with organic groups on the polysaccharide backbone and/or on any branches which may be present, such that the poly alpha-1,6-glucan derivative comprises, in some aspects, unsubstituted and substituted alpha-D-glucose rings. As used herein, the term “randomly substituted” means the substituents on the glucose rings in the randomly substituted polysaccharide occur in a non-repeating or random fashion. That is, the substitution on a substituted glucose ring may be the same or different [i.e. the substituents (which may be the same or different) on different atoms in the glucose rings in the polysaccharide] from the substitution on a second substituted glucose ring in the polysaccharide, such that the overall substitution on the polymer has no pattern. Further, the substituted glucose rings occur randomly within the polysaccharide (i.e., there is no pattern with the substituted and unsubstituted glucose rings within the polysaccharide).

In some embodiments, depending on reaction conditions and the specific substituent used to derivatize the poly alpha-1,6-glucan, the glucose monomers of the polymer backbone may be disproportionately substituted relative to the glucose monomers of any branches, including branches via alpha-1,2 and/or alpha-1,3 linkages, if present. In another embodiment, the glucose monomers of the branches, including branches via alpha-1,2 and/or alpha-1,3 linkages, if present, may be disproportionately substituted relative to the glucose monomers of the polymer backbone. In some embodiments, depending on reaction conditions and the specific substituent used, substitution of the poly alpha-1,6-glucan may occur in a block manner.

In some embodiments, depending on reaction conditions and the specific substituent used to derivatize the poly alpha-1,6-glucan, it is possible that the hydroxyl groups at certain glucose carbon positions may be disproportionately substituted. For example, in some embodiments, the hydroxyl at carbon position 2, 3, or 4 may be more substituted than the hydroxyls at other carbon positions.

The poly alpha-1,6-glucan derivatives disclosed herein comprise poly alpha-1,6-glucan substituted with at least one organic group, wherein the at least one organic group or groups are independently linked to the poly alpha-1,6-glucan polysaccharide backbone and/or to any branches through a linkage moiety selected from

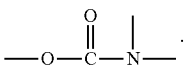

In addition to the organic groups that linked to the poly alpha-1,6-glucan through

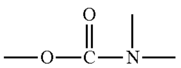

linkage moiegy, the poly alpha-1,6-glucan derivatives disclosed here in may further comprise additional organic groups linked to the poly alpha-1,6-glucan, if present, through a linkage moiety selected from —OCO— (ester), $—OSO_2—$ (sulfonyl), —O— (ether), or —OCOO— (carbonate).

It may be preferred that the poly alpha-1,6-glucan derivatives disclosed here are substantially free from of hydrophilic group modifications. By substantially free it is typically meant the derivatives are typically not deliberately substituted. However, very minor amounts of substitutions e.g. due to impurities or by-products from hydrophobic substitution reactions are allowed.

Further, the poly alpha-1,6-glucan derivatives disclosed here in may further comprise other functional groups as modification.

In typical aspects, the at least one organic group can derivatize the poly alpha-1,6-glucan at the 2, 3, and/or 4 glucose carbon position of a glucose monomer on the backbone of the glucan, and/or at the 2, 3, 4, or 6 glucose carbon position(s) of a glucose monomer on a branch, if present. At unsubstituted positions, a hydroxyl group is present in a glucose monomer.

In one embodiment, the at least one organic group comprises a $C_1$ to $C_{18}$ alkyl, a $C_2$ to $C_{18}$ alkenyl, a $C_2$ to $C_{18}$ alkynyl, a polyether comprising repeat units of $(—CH_2CH_2O—)$, $(—CH_2CH(CH_3)O—)$, $(—CH(CH_3)CH(CH_3)O—)$, $(—CH_2CH(CH_2CH_3)O—)$, or a mixture thereof, wherein the total number of repeat units is in the range of from 2 to 100, a $C_6$ to $C_{20}$ aryl, a benzyl, a $C_1$-$C_{18}$ alkyl sulfonyl, a $C_6$-$C_{20}$ aryl sulfonyl, a p-toluenesulfonyl group, or any combination thereof. A suitable organic group is a polyether comprising repeat units of $C_3$-$C_{18}$ alkoxylate.

In another embodiment, the at least one organic group comprises a $C_1$ to $C_{18}$ alkyl, a benzyl, a p-toluenesulfonyl group, or any combination thereof. In yet another embodiment, the at least one organic group comprises a benzyl group, and the benzyl group is further substituted with one or more of a halogen, a cyano, an ester, an amide, an ether group, a $C_1$ to $C_6$ alkyl group, an aryl group, a $C_2$ to $C_6$ alkenyl group, a $C_2$ to $C_6$ alkynyl group, or any combination thereof.

In one embodiment, at least one organic group comprises a $C_1$ to $C_{18}$ alkyl group, a hydroxy alkyl group, a $C_2$ to $C_{18}$ alkenyl group, a $C_2$ to $C_{18}$ alkynyl group, a benzyl group, a $C_6$ to $C_{20}$ aryl group, a polyether comprising repeat units of $(—CH_2CH_2O—)$, $(—CH_2CH(CH_3)O—)$, $(—CH(CH_3)CH(CH_3)O—)$, $(—CH_2CH(CH_2CH_3)O—)$, or a mixture thereof, wherein the total number of repeat units is in the range of 2 to 100, or any combination thereof. In another embodiment, at least one organic group comprises a $C_1$-$C_{10}$ alkyl group, a $C_1$-$C_{10}$ hydroxyl alkyl group, a polyether comprising repeat units of $(—CH_2CH_2O—)$, $(—CH_2CH(CH_3)O—)$, $(—CH(CH_3)CH(CH_3)O—)$, $(—CH_2CH(CH_2CH_3)O—)$, or a mixture thereof, wherein the total number of repeat units is in the range of 2 to 100, or any combination thereof. In an additional embodiment, at least one organic group comprises a $C_6$-$C_{20}$ aryl group, optionally substituted with alkyl groups. In a further embodiment, the aryl group is a tolyl group.

It may be preferred that the poly alpha-1,6-glucan derivatives disclosed here are substantially free from hydrophilic group modifications. Herein, the hydrophilic group are typically selected from carboxylic acid, carboxylic acid salt, sulfonic acid derivative, sulfonic acid derivative salt, sulfuric acid derivative, sulfuric acid derivative salt, thiosulfate, thiosulfate salt, phosphoric acid derivative, phosphoric acid derivative salt, alkyl amine, alkyl substituted ammonium salt, quaternized pyridine salt, quaternized imidazole salt, or any combination thereof. The hydrophilic group may include a carboxylic acid, an alkyl substituted ammonium salt, a sulfonate, an alkyl sulfonate, a sulfate, a thiosulfate, or any combination thereof.

The poly alpha-1,6-glucan derivatives disclosed herein contain organic group substituents and are of interest due to their solubility characteristics in water, which can be varied by appropriate selection of substituents and the degree of substitution. Compositions comprising the poly alpha-1,6-glucan derivatives can be useful in a wide range of applications, including laundry and dish applications. Poly alpha-1,6-glucan derivatives having greater than 0.1 weight percent (wt %) solubility in water can be useful as rheology modifiers, emulsion stabilizers, and dispersing agents in compositions, wherein the products are in a primarily water-based formulation and optical clarity is desired. Poly alpha-1,6-glucan derivatives having less than 0.1 wt % solubility in water can be useful as rheology modifiers, emulsion stabilizers, and dispersing agents in laundry and dish applications, wherein the products are typically in formulations which contain organic solvents to solubilize or disperse the poly alpha-1,6-glucan derivatives. In one embodiment of the composition, the poly alpha-1,6-glucan derivative has a DoS of about 0.001 to 3.00, or from 0.01 to 2.50, or from 0.1 to 2.00, or from 0.1 to about 1.50 and a solubility of 0.1% by weight or higher in deionized water at 25° C. In another embodiment of the composition, the poly alpha-1,6-glucan derivative has a DoS of about 0.001 to about 2.00 and a solubility of less than 0.1% by weight in pH 7 water at 25° C.

Compositions comprising poly alpha-1,6-glucan derivatives can be sustainable materials in the above-mentioned applications. Furthermore, biodegradable alpha-1,6-glucan derivatives are preferred over non-biodegradable materials from an environmental footprint perspective. Biodegradability of a material can be evaluated by methods known in the art, for example as disclosed in the Examples section herein below. In one embodiment, the poly alpha-1,6-glucan derivative has a biodegradability as determined by the OECD 301B Ready Biodegradability $CO_2$ Evolution Test Method of at least 10% on the $90^{th}$ day test duration. In another embodiment, the poly alpha-1,6-glucan derivative has a biodegradability as determined by the OECD 301B Ready Biodegradability Test Method of at least 5%, 10%, 15%, 20%, 25%, 30%, 35%, 40%, 45%, 50%, 55%, 60%, 65%, 70%, 75%, or 80%, or any value between 5% and 80%, on the $90^{th}$ day test duration. In yet another embodiment, the poly alpha-1,6-glucan derivative has a biodegradability as determined by the OECD 301B Ready Biodegradability $CO_2$ Evolution Test Method of at least 5%, 10%, 15%, 20%, 25%, 30%, 35%, 40%, 45%, 50%, 55%, or 60%, or any value between 5% and 60%, on the $60^{th}$ day test duration.

The poly alpha-1,6-glucan derivatives disclosed herein can be comprised in a personal care product, pharmaceutical product, household product, or industrial product in an amount that provides a desired degree of one or more of the following physical properties to the product: thickening, freeze/thaw stability, lubricity, moisture retention and release, texture, consistency, shape retention, emulsification, binding, suspension, dispersion, and gelation, for example. Examples of a concentration or amount of a poly alpha-1, 6-glucan derivative as disclosed herein in a product, on a weight basis, can be about 0.1-3 wt %, 1-2 wt %, 1.5-2.5 wt %, 2.0 wt %, 0.1-4 wt %, 0.1-5 wt %, or 0.1-10 wt %, for example.

The terms "poly alpha-1,6-glucan" and "dextran" are used interchangeably herein. Dextrans represent a family of complex, branched alpha-glucans generally comprising chains of alpha-1,6-linked glucose monomers, with periodic side chains (branches) linked to the straight chains by alpha-1, 3-linkage (loan et al., *Macromolecules* 33:5730-5739) and/or alpha-1,2-linkage. Production of dextran for producing a poly alpha-1,6-glucan derivative herein can be done, for example, through fermentation of sucrose with bacteria (e.g., *Leuconostoc* or *Streptococcus* species), where sucrose serves as the source of glucose for dextran polymerization (Naessens et al., *J. Chem. Technol. Biotechnol.* 80:845-860; Sarwat et al., *Int. J. Biol. Sci.* 4:379-386; Onilude et al., *Int. Food Res. J.* 20:1645-1651). Alternatively, poly alpha-1,6-glucan can be prepared using a glucosyltransferase (dextransucrase) such as (but not limited to) GTF1729, GTF1428, GTF5604, GTF6831, GTF8845, GTF0088, and GTF8117 as described in WO2015/183714 and WO2017/091533, both of which are incorporated herein by reference.

In some embodiments, the poly alpha-1,6-glucan derivative comprises a backbone of glucose monomer units wherein greater than or equal to 40%, 45%, 50%, 55%, 60%, 65%, 70%, 75%, 80%, 90%, 95%, 96%, 97%, 98%, 99%, 99.5%, or 100% of the glucose monomer units are linked via alpha-1,6-glycosodic linkages. The backbone of the poly alpha-1,6-glucan derivative can comprise, for example, 0.5%, 1%, 2%, 3%, 4%, 5%, 10%, 15%, 20%, 25%, 30%, 35%, 40%, 45%, 50%, 55%, or 60% glucose monomer units which are linked via alpha-1,2, alpha-1,3, and/or alpha-1,4 glycosidic linkages. In some aspects, the poly alpha-1,6-glucan derivative comprises a backbone that is linear (unbranched).

Dextran "long chains" herein can comprise "substantially (or mostly) alpha-1,6-glucosidic linkages", meaning that they can have at least about 98.0% alpha-1,6-glucosidic linkages in some aspects. Dextran herein can comprise a "branching structure" (branched structure, such as dendritic) in some aspects. It is contemplated that in this structure, long chains branch from other long chains, likely in an iterative manner (e.g., a long chain can be a branch from another long chain, which in turn can itself be a branch from another long chain, and so on). It is contemplated that long chains in this structure can be "similar in length", meaning that the length (DP [degree of polymerization]) of at least 70% of all the long chains in a branching structure is within plus/minus 30% of the mean length of all the long chains of the branching structure.

Dextran in some embodiments can also comprise "short chains" branching from the long chains, typically being one to three glucose monomers in length, and typically comprising less than about 10% of all the glucose monomers of a dextran polymer. Such short chains typically comprise alpha-1,2-, alpha-1,3-, and/or alpha-1,4-glucosidic linkages (it is understood that there can also be a small percentage of such non-alpha-1,6 linkages in long chains in some aspects). In certain embodiments, the poly-1,6-glucan with branching is produced enzymatically according to the procedures in WO2015/183714 and WO2017/091533 (both incorporated herein by reference) where, for example, alpha-1,2-branching enzymes such as GTFJ18T1 or GTF9905 can be added during or after the production of the dextran polymer (polysaccharide). In some embodiments, any other enzyme known to produce alpha-1,2-branching can be added. Poly alpha-1,6-glucan with alpha-1,3-branching can be prepared as disclosed in Vuillemin et al. (2016, *J. Biol Chem.* 291: 7687-7702) or U.S. Appl. No. 62/871,796, which are incorporated herein by reference. The degree of branching of poly alpha-1,6-glucan or a poly alpha-1,6-glucan derivative in such embodiments has less than or equal to 50%, 40%, 30%, 20%, 10%, or 5% (or any integer value between 5% and 50%) of short branching, for example alpha-1,2-branching or 1,3-branching. In one embodiment, the poly alpha-1,6-glucan or the poly alpha-1,6-glucan derivative has a degree of alpha-1,2-branching that is less than 50%. In another embodiment, the poly alpha-1,6-glucan or the poly alpha-1,6-glucan derivative has a degree of alpha-1,2-branching that is at least 5%. In one embodiment, at least 5% of the backbone glucose monomer units of the poly alpha-1,6-glucan derivative have branches via alpha-1,2- or alpha-1, 3-glycosidic linkages. In one embodiment, the poly alpha-1,6-glucan or the poly alpha-1,6-glucan derivative comprises a backbone of glucose monomer units wherein greater than or equal to 40% of the glucose monomer units are linked via alpha-1,6-glycosidic linkages. In one embodiment, the poly alpha-1,6-glucan derivative comprises a backbone of glucose monomer units wherein greater than or equal to 40% of the glucose monomer units are linked via alpha-1,6-glycosidic linkages and at least 5% of the glucose monomer units have branches via alpha-1,2- or alpha-1,3-glycosidic linkages. In one embodiment, the poly alpha-1, 6-glucan derivative comprises a backbone of glucose monomer units wherein greater than or equal to 40% of the glucose monomer units are linked via alpha-1,6-glycosidic linkages and at least 5% of the glucose monomer units have branches via alpha-1,2 linkages. In one embodiment, the poly alpha-1,6-glucan derivative comprises a backbone of glucose monomer units wherein greater than or equal to 40% of the glucose monomer units are linked via alpha-1,6-glycosidic linkages and at least 5% of the glucose monomer units have branches via alpha-1,3 linkages. In one embodiment, the poly alpha-1,6-glucan or poly alpha-1,6-glucan derivative is linear, or predominantly linear. In some aspects, about, at least about, or less than about, 1%, 2%, 3%, 4%, 5%, 10%, 15%, 20%, 25%, 30%, 35%, 40%, 50%, 55%, 60%, 65%, 70%, 75%, 80%, 85%, or 90% of the backbone glucose monomer units of a poly alpha-1,6-glucan or derivative thereof as presently disclosed can have branches via alpha-1,2 and/or alpha-1,3 glycosidic linkages. In some aspects, about, at least about, or less than about, 1%, 2%, 2.5%, 5%, 10%, 15%, 20%, 25%, 30%, 35%, 40%, or 45% of all the glycosidic linkages of an alpha-1,2- and/or alpha-1,3-branched poly alpha-1,6-glucan or derivative thereof as presently disclosed are alpha-1,2 and/or alpha-1,3 glycosidic linkages. The amount of alpha-1,2-branching or alpha-1,3-branching can be determined by NMR methods, as disclosed in the Examples.

The poly alpha-1,6-glucan and poly alpha-1,6-glucan derivatives disclosed herein can have a number-average degree of polymerization (DPn) or weight-average degree of polymerization (DPw) in the range of 5 to 4000. In some embodiments, the DPn or DPw can be in the range of 5 to 100, 5 to 500, 5 to 1000, 5 to 1500, 5 to 2000, 5 to 2500, 5 to 3000, or 5 to 4000. In some embodiments, the DPn or DPw can be in the range of 50 to 500, 50 to 1000, 50 to 1500, 50 to 2000, 50 to 3000, or 50 to 4000. In some embodiments, the DPn or DPw can be in the range of 400 to 4000, 400 to 3000, 400 to 2000, or 400 to 1000. In some embodiments, the DPn or DPw can be about, at least about, or less than about, 5, 10, 25, 50, 100, 250, 500, 1000, 1500, 2000, 2500, 3000, 4000, 5000, 6000, 5-100, 5-250, 5-500, 5-1000, 5-1500, 5-2000, 5-2500, 5-3000, 5-4000, 5-5000, 5-6000, 10-100, 10-250, 10-500, 10-1000, 10-1500, 10-2000, 10-2500, 10-3000, 10-4000, 10-5000, 10-6000, 25-100, 25-250, 25-500, 25-1000, 25-1500, 25-2000, 25-2500, 25-3000, 25-4000, 25-5000, 25-6000, 50-100, 50-250, 50-500, 50-1000, 50-1500, 50-2000, 50-2500, 50-3000, 50-4000, 50-5000, 50-6000, 100-100, 100-250, 100-500, 100-1000, 100-1500, 100-2000, 100-2500, 100-3000, 100-4000, 100-5000, or 100-6000.

The poly alpha-1,6-glucan derivative comprises:

(i) a poly alpha-1,6-glucan backbone of glucose monomer units, wherein greater than or equal to 40% of the glucose monomer units are linked via alpha-1,6 glycosidic linkages, and wherein from 0% to less than 30% of the glucose monomer units are linked via alpha-1,3 glycosidic linkages, and optionally at least 5% of the backbone glucose monomer units have branches via alpha-1,2 and/or alpha-1,3 glycosidic linkages; and (ii) at least one organic group linked to the poly alpha-1,6-glucan backbone through a

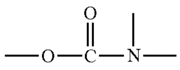

linkage moiety;

wherein, the poly alpha-1,6-glucan backbone has a weight average degree of polymerization of at least 5; and wherein, the poly alpha-1,6-glucan derivative has a degree of substitution of

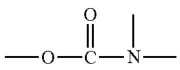

linkage moiety of from 0.001 to 3.00.

The poly alpha-1,6-glucan derivative comprises poly alpha-1,6-glucan substituted with at least one organic group on the polysaccharide backbone and/or on one or more of the optional branches. When substitution occurs on a glucose monomer contained in the backbone, the polysaccharide is derivatized at the 2, 3, and/or 4 glucose carbon position(s) with a organic group as defined herein which is linked to the polysaccharide through a linkage moiety. When substitution occurs on a glucose monomer contained in a branch, the polysaccharide is derivatized at the 2, 3, 4, and/or 6 glucose carbon position(s) with a organic group as defined herein which is linked to the polysaccharide through a linkage moiety. The organic groups are independently linked to the poly alpha-1,6-glucan through a

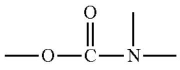

linkage moiety in place of the hydroxyl group originally present in the underivatized (unsubstituted) poly alpha-1,6-glucan.

When the linkage moiety is

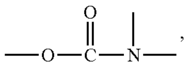, a poly alpha-1,6-glucan derivative is termed a glucan "carbamate" compound herein by virtue of comprising the substructure $-C_G-$

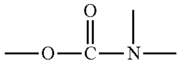

$-C_R-$, wherein "$-C_G-$" represents a carbon of a glucose monomer unit of a poly alpha-1,6-glucan ether compound, and wherein "$-C_R-$" is comprised in the organic group. The poly alpha-1,6-glucan derivative may comprise two $-C_R-$ groups. In one embodiment, the linkage moiety is

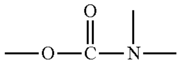

and the poly alpha-1,6-glucan derivative comprises a poly alpha-1,6-glucan carbamate compound. A poly alpha-1,6-glucan mixed carbamate compound contains the linkage moiety

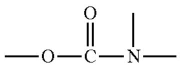

and two or more types of a organic group.

In one embodiment, at least one linkage moiety is

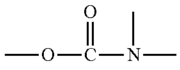

and at least one linkage moiety is $-OSO_2-$, and the poly alpha-1,6-glucan derivative comprises both carbamate and sulfonyl substituents. In another embodiment, at least one linkage moiety is

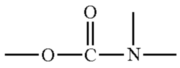

and at least one linkage moiety is —O—, and the poly alpha-1,6-glucan derivative comprises both carbamate and ether substituents. In another embodiment, at least one linkage moiety is

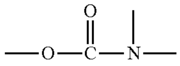

and at least one linkage moiety is —O—, and the poly alpha-1,6-glucan derivative comprises both carbamate and ether substituents.

Compositions disclosed herein can comprise, or consist essentially of, one or more poly alpha-1,6-glucan derivatives as disclosed herein. In one embodiment, a composition can comprise one poly alpha-1,6-glucan derivative. In another embodiment, a composition may comprise two or more poly alpha-1,6-glucan derivatives wherein the linkage moieties are the same and the organic groups are different, or two or more derivatives wherein the linkage moieties (when a combination of carbamate and a second linkage group) are different and the organic groups are the same. A composition may also comprise two or more derivatives wherein both the linkage moieties and the organic groups are different.

The term "degree of substitution" (DOS) as used herein refers to the average number of hydroxyl groups substituted in each monomeric unit (glucose) of a poly alpha-1,6-glucan derivative, which includes the monomeric units within the backbone and within any alpha-1,2 or alpha-1,3 branches which may be present. Since there are at most three hydroxyl groups in a glucose monomeric unit in a poly alpha-1,6-glucan polymer, the overall degree of substitution of a poly alpha-1,6-glucan derivative herein can be no higher than 3.00. It would be understood by those skilled in the art that, since a poly alpha-1,6-glucan derivative as disclosed herein can have a degree of substitution between about 0.01 to about 3.00, the substituents on the polysaccharide cannot only be hydroxyl. The degree of substitution of a poly alpha-1,6-glucan derivative can be stated with reference to a specific substituent or with reference to the overall degree of substitution, that is, the sum of the DoS of each different substituent for a glucan derivative as defined herein. As used herein, when the degree of substitution is not stated with reference to a specific substituent or substituent type, the overall degree of substitution of the poly alpha-1,6-glucan derivative is meant. The target DoS can be chosen to provide the desired solubility and performance of a composition comprising a poly alpha-1,6-glucan derivative in the specific application of interest.

The poly alpha-1,6-glucan derivatives disclosed herein have a DoS in the range of about 0.001 to about 3.00, for example of about 0.001 to about 2.50, or for example of about 0.01 to about 2.00, or for example of about 0.10 to about 1.50, or for example of about 0.20 to 1.40, or for example 0.20 to 1.30, or for example 0.20 to 1.20, or for example 0.20 to 1.00, about 0.20 to about 0.80, or for example of about 0.20 to about 0.60, or for example of about 0.20 to about 0.40. The degree of substitution of a poly alpha-1,6-glucan derivative can be stated with reference to a specific substituent or with reference to the overall degree of substitution, that is, the sum of the DoS of each different substituent type for a glucan derivative as defined herein. As used herein, when the degree of substitution is not stated with reference to a specific substituent type, the overall degree of substitution of the poly alpha-1,6-glucan derivative is meant.

The poly alpha-1,6-glucan derivatives disclosed herein have a DoS of carbamate linkage moiety of from 0.001 to 3.00, or from 0.01 to 2.50, or from 0.1 to 2.00, or from 0.20 to 1.00, or in the range of about 0.20 to about 1.00, for example of about 0.20 to about 0.80, or for example of about 0.20 to about 0.60, or for example of about 0.20 to about 0.40, or for example of about 0.50 to 0.60.

In one embodiment of a poly alpha-1,6-glucan derivative disclosed herein, at least one organic group is selected from: a $C_1$ to $C_{18}$ alkyl group, a hydroxy alkyl group, a $C_2$ to $C_{18}$ alkenyl group, a $C_2$ to $C_{18}$ alkynyl group, a benzyl group, a $C_6$ to $C_{20}$ aryl group, a polyether comprising repeat units of $(-CH_2CH_2O-)$, $(-CH_2CH(CH_3)O-)$, $(-CH(CH_3)CH(CH_3)O-)$, $(-CH_2CH(CH_2CH_3)O-)$, or a mixture thereof, wherein the total number of repeat units is in the range of 2 to 100, or any combination thereof.

The term "alkyl group", as used herein, refers to linear, branched, or cyclic ("cycloalkyl" or "cycloaliphatic") hydrocarbon groups containing no unsaturation. The alkyl group can be substituted, for example with another alkyl group or with at least one hydroxyalkyl group or dihydroxy alkyl group. In one embodiment, the organic group is a $C_1$ to $C_{18}$ alkyl group, for example a $C_4$ to $C_{18}$ alkyl group, or for example a $C_1$ to $C_{10}$ alkyl group. The alkyl group may be, for example, a methyl, ethyl, propyl, butyl, pentyl, hexyl, heptyl, octyl, nonyl, decyl, undecyl, dodecyl, tridecanyl, tetradecanyl, pentadecanyl, hexadecanyl, heptadecanyl, or octadecanyl group. One or more carbons of an alkyl group can be substituted with another alkyl group, making the alkyl group branched. Examples of branched chain isomers of linear alkyl groups include isopropyl, iso-butyl, tert-butyl, sec-butyl, isopentyl, neopentyl, isohexyl, neohexyl, 2-ethylhexyl, 2-propylheptyl, and isooctyl. In one embodiment, the organic group is a methyl group. In one embodiment, the organic group is an ethyl group. In one embodiment, the organic group is a propyl group.

One or more carbons of an alkyl group can be substituted with at least one hydroxyalkyl group. Suitable hydroxyalkyl groups are hydroxymethyl $(-CH_2OH)$, hydroxyethyl (e.g., $-CH_2CH_2OH$, $-CH(OH)CH_3$), hydroxypropyl (e.g., $-CH_2CH_2CH_2OH$, $-CH_2CH(OH)CH_3$, $-CH(OH)CH_2CH_3$), hydroxybutyl, and hydroxypentyl groups. Other examples include dihydroxy alkyl groups (diols) such as dihydroxymethyl, dihydroxyethyl, dihydroxypropyl, dihydroxybutyl and dihydroxypentyl. In another embodiment, the alkyl group is a cycloalkyl group, and the cycloalkyl group may be, for example, a cyclopentyl, cyclohexyl, cycloheptyl, cyclooctyl, cyclononyl, or cyclodecyl group. In one embodiment, the cycloalkyl group is a $C_5$ to $C_{10}$ cycloalkyl group. In one embodiment, the organic group is a hydroxy alkyl group.

A substitution on an alkyl group in certain embodiments may be bonded to the terminal carbon atom of the alkyl group, where the terminal carbon group is opposite the carbon atom that is linked to the ether, sulfonyl, carbonate, or carbamate moiety, which in turn is linked to an oxygen of the glucan polymer. An example of this terminal substitution is in the hydroxypropyl group $-CH_2CH_2CH_2OH$. Alternatively, a substitution may be on an internal carbon atom of an alkyl group. An example on an internal substitution is in the hydroxypropyl group $-CH_2CH(OH)CH_3$.

In another embodiment, an alkyl group can contain one or more heteroatoms such as oxygen, sulfur, and/or nitrogen within the hydrocarbon chain. In another embodiment, an alkyl group can contain one or more heteroatoms such as oxygen and/or sulfur within the hydrocarbon chain. Examples include alkyl groups containing an alkyl glycerol alkoxylate moiety (-alkylene-$OCH_2CH(OH)CH_2OH$), a moiety derived from ring-opening of 2-ethylhexl glycidyl ether, and a tetrahydropyranyl group, for example as derived from dihydropyran. Derivatives prepared with dihydropyran or alternatively dihydrofuran would afford acetal linkages with the polyglucan backbone. The acetal linkage is represented by $R_2C(OR')_2$) where R' are joined together in the cyclic ring of the dihydropyran or dihydrofuran.

In another embodiment, the organic group is a $C_2$ to $C_{18}$ alkenyl group, and the alkenyl group may be linear, branched, or cyclic. As used herein, the term "alkenyl group" refers to hydrocarbon groups containing at least one carbon-carbon double bond. Examples of alkenyl groups include ethenyl, propenyl, butenyl, pentenyl, hexenyl, cyclohexyl, and allyl groups. In other embodiments, one or more carbons of the alkenyl group can have substitution(s) with an alkyl group, or with a hydroxyalkyl or dihydroxy alkyl group. Examples of such substituent alkyl groups include methyl, ethyl, and propyl groups. In one embodiment, the alkenyl group is a $C_4$ to $C_{18}$ alkene group.

Optionally, an alkenyl group can contain one or more heteroatoms such as oxygen, sulfur, and/or nitrogen within the hydrocarbon chain, for example an alkenyl group can contain a moiety derived from ring-opening of an allyl glycidyl ether.

In another embodiment, the organic group is a $C_2$ to $C_{18}$ alkynyl group. As used herein, the term "alkynyl" refers to linear and branched hydrocarbon groups containing at least one carbon-carbon triple bond. The alkynyl group may be, for example, propyne, butyne, pentyne, or hexyne. The alkynyl group may be substituted, for example with alkyl, hydroxyalkyl, or dihydroxy alkyl groups. Optionally, an alkynyl group can contain one or more heteroatoms such as oxygen, sulfur, and/or nitrogen within the hydrocarbon chain.

In another embodiment, the organic group is a polyether comprising repeat units of ($-CH_2CH_2O-$), ($-CH_2CH(CH_3)O-$), ($-CH(CH_3)CH(CH_3)O-$), ($-CH_2CH(CH_2CH_3)O-$), or a mixture thereof, wherein the total number of repeat units is in the range of 2 to 100. In one embodiment, the organic group is a polyether group comprising $(-CH_2CH_2O-)_{4\text{-}100}$. In another embodiment, the organic group is a polyether group comprising $(-CH_2CH(CH_3)O-)_{4\text{-}100}$. In another embodiment, the organic group is a polyether group comprising $(-CH_2CH(CH_2CH_3)O-)_{2\text{-}100}$. In another embodiment, the organic group is a polyether group comprising $(-CH(CH_3CH(CH_3)O-)_{2\text{-}100}$. As used herein, the subscript designating a range of values will be used to designate the potential number of repeat units, for example, $(CH_2CH_2O)_{2\text{-}100}$ means a polyether group containing in the range of from 2 to 100 repeat units. In some aspects, a polyether group herein can be capped such as with a methoxy, ethoxy, or propoxy group.

In another embodiment, the organic group is an aryl group. As used herein, the term "aryl" means an aromatic/carbocyclic group having a single ring (e.g., phenyl), multiple rings (e.g., biphenyl), or multiple condensed rings in which at least one is aromatic, (e.g., 1,2,3,4-tetrahydronaphthyl, naphthyl, anthryl, or phenanthryl), which is optionally mono-, di-, or trisubstituted with alkyl groups, such as a methyl, ethyl, or propyl group. In one embodiment, the aryl group is a $C_6$ to $C_{20}$ aryl group. In another embodiment, the aryl group is a methyl substituted aryl group, for example a tolyl ($-C_6H_4CH_3$) or xylyl [$-C_6H_3(CH_3)_2$] group. In a further embodiment, the tolyl group is a p-tolyl group. In yet another embodiment, the aryl group is a benzyl group ($-CH_2-C_6H_5$). The benzyl group can optionally be further substituted with one or more of a halogen, a cyano, an ester, an amide, an ether group, a $C_1$ to $C_6$ alkyl group, an aryl group, a $C_2$ to $C_6$ alkene group, a $C_2$ to $C_6$ alkyne group, or any combination thereof. In an additional embodiment, the aryl group is a phenyl group.

In one embodiment, the poly alpha-1,6-glucan derivative has a DoS of carbamate linkage moiety about 0.001 to about 2.00, at least one linkage moiety is

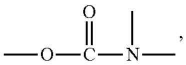
, and at least one organic group is a methyl, ethyl, phenyl, benzyl, or p-tolyl group. In another embodiment, the poly alpha-1,6-glucan derivative has a DoS of carbamate linkage moiety about 0.01 to about 1.50, at least one linkage moiety is

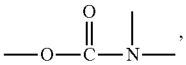
, and at least one organic group is a methyl, ethyl, phenyl, benzyl, or p-tolyl group. In a further embodiment, the poly alpha-1,6-glucan derivative has a DoS of carbamate linkage moiety about 0.01 to about 1.00, at least one linkage moiety is

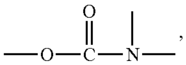
, and at least one organic group is a methyl, ethyl, phenyl, benzyl, or p-tolyl group. In yet another embodiment, the poly alpha-1,6-glucan derivative has a DoS of carbamate linkage moiety about 0.1 to about 0.80, at least one linkage moiety is

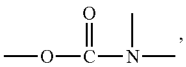
, and at least one organic group is a methyl, ethyl, phenyl, benzyl, or p-tolyl group.

In one embodiment, the poly alpha-1,6-glucan derivative has a DoS of about 0.001 to about 3.00, at least one linkage moiety is

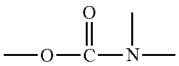

and at least one linkage moiety is $-OSO_2-$, and at least one organic group is a methyl, ethyl, phenyl, benzyl, or p-tolyl group. In another embodiment, the poly alpha-1,6-glucan derivative has a DoS of about 0.001 to about 3.00, at least one linkage moiety is

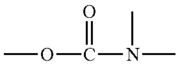

and at least one linkage moiety is —$OSO_2$—, and at least one organic group is a methyl, ethyl, phenyl, benzyl, or p-tolyl group. In a further embodiment, the poly alpha-1,6-glucan derivative has a DoS of about 0.001 to about 3.00, at least one linkage moiety is

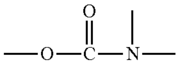

and at least one linkage moiety is —$OSO_2$—, and at least one organic group is a methyl, ethyl, phenyl, benzyl, or p-tolyl group. In yet another embodiment, the poly alpha-1,6-glucan derivative has a DoS of about 0.001 to about 3.00, at least one linkage moiety is

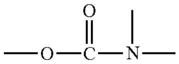

and at least one linkage moiety is —$OSO_2$—, and at least one organic group is a methyl, ethyl, phenyl, benzyl, or p-tolyl group.

In one embodiment of a poly alpha-1,6-glucan derivative, the linkage moiety is

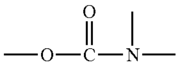, the DoS of carbamate linkage moiety is from 0.001 to 3.00, and at least one organic group comprises a $C_1$ to $C_{18}$ alkyl group, a hydroxy alkyl group, a $C_2$ to $C_{18}$ alkenyl group, a $C_2$ to $C_{18}$ alkynyl group, a benzyl group, a $C_6$ to $C_{20}$ aryl group, a polyether comprising repeat units of (—$CH_2CH_2O$—), (—$CH_2CH(CH_3)O$—), (—$CH(CH_3)CH(CH_3)O$—), (—$CH_2CH(CH_2CH_3)O$—), or a mixture thereof, wherein the total number of repeat units is in the range of from 2 to 100, or any combination thereof. In another embodiment, the linkage moiety is —O—, the DoS is from 0.20 to 1.00, and at least one organic group comprises a $C_1$-$C_{10}$ alkyl group, a $C_1$-$C_{10}$ hydroxyl alkyl group, a polyether comprising repeat units of (—$CH_2CH_2O$—), (—$CH_2CH(CH_3)O$—), (—$CH(CH_3)CH(CH_3)O$—), (—$CH_2CH(CH_2CH_3)O$—), or a mixture thereof, wherein the total number of repeat units is in the range of 2 to 100, or any combination thereof. In an additional embodiment, the linkage moiety is

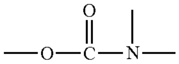, the DoS of carbamate linkage moiety is from 0.20 to 1.00, and at least one organic group comprises a benzyl group or a benzyl group substituted with one or more of a halogen, a cyano, an ester, an amide, an ether group, a $C_1$ to $C_6$ alkyl group, an aryl group, a $C_2$ to $C_6$ alkene group, a $C_2$ to $C_6$ alkyne group, or any combination thereof. In a further embodiment, the linkage moiety is

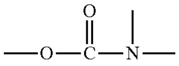, the DoS of carbamate linkage moiety is from 0.001 to 3.00, and at least one organic group comprises a $C_1$-$C_{10}$ alkyl group, $C_1$-$C_{10}$ hydroxyl alkyl group, a polyether comprising repeat units of (—$CH_2CH_2O$—), (—$CH_2CH(CH_3)O$—), (—$CH(CH_3)CH(CH_3)O$—), (—$CH_2CH(CH_2CH_3)O$—), or a mixture thereof, wherein the total number of repeat units is in the range of from 2 to 100, a benzyl group, or any combination thereof. In yet another embodiment, the linkage moiety is

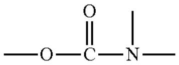, the DoS of carbamate linkage moiety is from 0.001 to 3.00, and at least one organic group comprises a $C_6$-$C_{20}$ aryl group, optionally substituted with alkyl groups.

In one embodiment of a poly alpha-1,6-glucan derivative, the linkage moiety is —OCONH—, the DoS is about 0.001 to about 1.5, and at least one organic group comprises a $C_1$ to $C_{18}$ alkyl group, a hydroxy alkyl group, a carboxy alkyl group, a $C_2$ to $C_{18}$ alkenyl group, a $C_2$ to $C_{18}$ alkynyl group, a benzyl group, a $C_6$ to $C_{20}$ aryl group, a polyether comprising repeat units of (—$CH_2CH_2O$—) and/or (—$CH_2CH(CH_3)O$—) wherein the total number of repeat units is in the range of from 3 to 100, or a combination thereof. In another embodiment, the linkage moiety is —OCONH—, the DoS is about 0.001 to about 1.5, and at least one organic group comprises a $C_1$-$C_{10}$ alkyl group, a $C_1$-$C_{10}$ hydroxyl alkyl group, a polyether comprising repeat units of (—$CH_2CH_2O$—) and/or (—$CH_2CH(CH_3)O$—) wherein the total number of repeat units is in the range of from 3 to 100, or a combination thereof. In an additional embodiment, the linkage moiety is —OCONH—, the DoS is about 0.001 to about 1.5, and at least one organic group comprises a benzyl group or a benzyl group substituted with one or more of a halogen, a cyano, an ester, an amide, an ether group, a $C_1$ to $C_6$ alkyl group, an aryl group, a $C_2$ to $C_6$ alkene group, a $C_2$ to $C_6$ alkyne group, or a combination thereof. In a further embodiment, the linkage moiety is —OCONH—, the DoS is about 0.001 to about 1.5, and at least one organic group comprises a $C_1$-$C_{10}$ alkyl group, $C_1$-$C_{10}$ hydroxyl alkyl group, a polyether comprising repeat units of (—$CH_2CH_2O$—) and/or (—$CH_2CH(CH_3)O$—) wherein the total number of repeat units is in the range of from 3 to 100, a benzyl group, or a combination thereof. In yet another embodiment, the linkage moiety is —OCONH—, the DoS is about 0.001 to about 1.5, and at least one organic group comprises a $C_6$-$C_{20}$ aryl group, optionally substituted with alkyl groups.

Poly alpha-1,6-glucan can be derivatized to a glucan carbamate compound by contacting the polysaccharide with a monoisocyanate comprising the desired organic group. For example, the polysaccharide can be modified by first dissolving or suspending the polysaccharide with a solvent and then adding the monoisocyanate and heating the mixture to 30-100° C. for a period of time. An aprotic solvent such as DMSO, DMF, or DMAc can be used. The polysaccharide to solvent weight ratio can range from 5:1 to 30:1, for example 10:1 to 20:1. The monoisocyanate can be added at a temperature in the range of 25° C. up to the boiling temperature of the system, for example at a temperature in the range of 40 to 80° C. The molar ratio of monoisocyanate to polysaccharide can range from 0.1:1 to 4.0:1, depending on the desired final degree of substitution. After the addition of the monoisocyanate, the mixture can be held at temperature for 0.1 to 24 hours, for example 0.5 to 4 hours. The derivatized polysaccharide can be precipitated by pouring the reactor contents into agitated water, methanol, isopropanol, ethanol, acetone, or mixtures thereof in a volume to weight ratio of 2-8 liters to 1 kilogram, for example at a volume to weight ratio of 4. The precipitated polysaccharide derivative can be filtered and dried.

In one embodiment, the polysaccharide derivative contains at least one carbamate substituent derived from an aliphatic, cycloaliphatic, or aromatic monoisocyanate. At least one carbamate substituent of the polysaccharide derivative can be derived from an aromatic monoisocyanate, for example phenyl, benzyl, diphenyl methyl, or diphenyl ethyl isocyanate, wherein the organic group corresponds to phenyl, benzyl, diphenyl methyl, or diphenyl ethyl, respectively. In one embodiment, at least one carbamate substituent is a phenyl carbamate group, wherein the organic group is phenyl. In another embodiment, at least one carbamate substituent of the polysaccharide derivative can be derived from an aliphatic monoisocyanate, for example ethyl, propyl, butyl, tert-butyl, pentyl, hexyl, heptyl, octyl, nonyl, decyl, undecyl, or octadecyl isocyanate, wherein the organic group corresponds to an ethyl, propyl, butyl, tert-butyl, pentyl, hexyl, heptyl, octyl, nonyl, decyl, undecyl, or octadecyl group, respectively. In a further embodiment, at least one carbamate substituent of the polysaccharide derivative can be derived from a cycloaliphatic monoisocyanate, for example cyclohexyl, cycloheptyl, or cyclododecyl isocyanate, wherein the organic group corresponds to a cyclohexyl, cycloheptyl, or cyclododecyl group, respectively. Useful monoisocyanates are commercially available.

A poly alpha-1,6-glucan derivative produced in a reaction as disclosed herein can optionally be washed one or more times with a liquid that does not readily dissolve the compound. For example, a poly alpha-1,6-glucan can be washed with water, alcohol, acetone, aromatics, or any combination of these, depending on the solubility of the ether compound therein (where lack of solubility is desirable for washing). In general, a solvent comprising an organic solvent such as alcohol is preferred for the washing. A poly glucan product can be washed one or more times with an aqueous solution containing methanol or ethanol, for example. For example, 70-95 wt % ethanol can be used to wash the product. A poly glucan product can be washed with a methanol:acetone (e.g., 60:40) solution in another embodiment. Hot water (about 95-100° C.) can be used in certain embodiments, such as for washing alkyl poly alpha-1,6-glucan ethers (e.g., ethyl poly alpha-1,6-glucan) and alkyl hydroxyalkyl poly alpha-1,6-glucan ethers (e.g., ethyl hydroxyethyl poly alpha-1,6-glucan).

The poly alpha-1,6-glucan can also be modified with one or more benzyl groups. The poly glucan can be benzylated by deprotonating one or more of the hydroxyl groups using a base, for example, sodium hydroxide, potassium hydroxide, sodium alkoxide, potassium alkoxide, sodium hydride followed by treatment with a benzylating agent, for example, a benzyl halide. The benzyl group of the benzylating agent can optionally substituted by one or more of halogen, a cyano, an ester, an amide, an ether group, a $C_1$ to $C_6$ alkyl group, an aryl group, a $C_2$ to $C_6$ alkene group, a $C_2$ to $C_6$ alkyne group, or any combination thereof. In some embodiments, the benzylating agent can be as represented by the following structure:

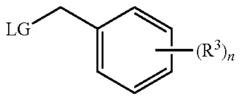

wherein LG is a leaving group, for example, chloride, bromide, iodide; $R^3$ is halogen, cyano, ester, amide, ether, $C_1$ to $C_6$ alkyl, aryl, $C_2$ to $C_6$ alkene, $C_2$ to $C_6$ alkyne; and n is 1, 2, 3, 4 or 5. Halogen can be fluoride, chloride, bromide or iodide. The ester can be benzyl-C(O)O—$R^1$, or the ester can be benzyl-OC(O)—$R^1$, wherein the $R^1$ group is a $C_1$ to $C_6$ alkyl or an aryl group. The ether can be a $C_1$ to $C_6$ alkyl ether or an aryl ether. The amide can be benzyl-C(O)N($R^2$)$_2$ or benzyl-N($R^2$)(O)C—, wherein each $R^2$ is independently hydrogen or $C_1$ to $C_6$ alkyl. In each of the above examples, the term 'benzyl' refers to the benzylating agent.

Deprotonation can take place in the presence of a base and an aqueous solvent, a base and an organic solvent, or a base and a mixture of an aqueous and organic solvent. Suitable organic solvents can include, for example, dimethyl sulfoxide, dimethyl acetamide, dimethyl formamide, pyridine, 1-methyl-2-pyrrolidinone or any combination thereof. In some embodiments, the poly glucan can be added to a mixture of the base and the solvent. Optionally, the mixture can be heated. The benzylating agent, for example, benzyl chloride, can then be added. In an aqueous system, as the degree of benzylation increases, the benzyl poly glucan precipitates from the solution, and can be removed by filtration. By utilizing organic solvents, or varying the temperature or concentration, the degree of substitution can be increased above 0.40. The benzyl poly glucan can be isolated using known techniques.

Any of the above substitution reactions can be repeated using a poly alpha-1,6-glucan as the starting material for further modification. This approach may be suitable for increasing the DoS of a organic group, and/or adding one or more different organic groups or a sulfonyl group to the ether compound. For example, a benzyl poly alpha-1,6-glucan ether product can be used as a substrate for further modification with carboxymethyl groups. A poly alpha-1,6-glucan methyl ether can be used as a substrate for further modification with a benzyl ether group.

Depending upon the desired application, compositions comprising a poly alpha-1,6-glucan derivative as disclosed herein can be formulated, for example, blended, mixed, or incorporated into, with one or more other materials and/or active ingredients suitable for use in various compositions, for example compositions for use in laundry care or dish care product. The term "compositions comprising a poly alpha-1,6-glucan derivative" in this context may include, for example, aqueous formulations, rheology modifying compositions, fabric treatment/care compositions, laundry care formulations/compositions, fabric softeners and dish care compositions each comprising a poly alpha-1,6-glucan derivative as disclosed herein.

As used herein, the term "effective amount" refers to the amount of the substance used or administered that is suitable to achieve the desired effect. The effective amount of material may vary depending upon the application. One of skill in the art will typically be able to determine an effective amount for a particular application or subject without undo experimentation.

The term "resistance to enzymatic hydrolysis" refers to the relative stability of the poly alpha-1,6-glucan derivative to enzymatic hydrolysis. Having a resistance to hydrolysis is important for the use of these materials in applications wherein enzymes are present, such as in detergent, fabric care, and/or laundry care applications. In some embodiments, the polysaccharide derivative is resistant to cellulases. In other embodiments, the polysaccharide derivative is resistant to proteases. In still further embodiments, the polysaccharide derivative is resistant to amylases. In yet other embodiments, the polysaccharide derivative is resistant to lipase. In yet other embodiments, the polysaccharide derivative is resistant to mannanases. In other embodiments, the polysaccharide derivative is resistant to multiple classes of enzymes, for example, two or more cellulases, proteases, amylases, lipases, mannanases, or combinations thereof. Resistance to any particular enzyme will be defined as having at least 10, 20, 30, 40, 50, 60, 70, 80, 90, 95 or 100% of the materials remaining after treatment with the respective enzyme. The percentage remaining may be determined by measuring the supernatant after enzyme treatment using SEC-HPLC. The assay to measure enzyme resistance can be determined using the following procedure: A sample of the poly alpha-1,6-glucan derivative is added to water in a vial and mixed using a PTFE magnetic stir bar to create a 1 percent by weight aqueous solution. The aqueous mixture is produced at pH 7.0 and 20° C. After the poly alpha-1,6-glucan derivative thereof has completely dissolved, 1.0 milliliter (mL) (1 percent by weight of the enzyme formulation) of cellulase (PURADEX® EGL), amylase (PURASTAR® ST L) protease (SAVINASE® 16.0L), or lipase (Lipex® 100L) is added and mixed for 72 hours (hrs) at 20° C. After 72 hrs of stirring, the reaction mixture is heated to 70° C. for 10 minutes to inactivate the added enzyme, and the resulting mixture is cooled to room temperature and centrifuged to remove any precipitate. The supernatant is analyzed by SEC-HPLC for recovered poly alpha-1,6-glucan derivative and compared to a control where no enzyme was added to the reaction mixture. Percent changes in area counts for the respective poly alpha-1,6-glucan derivative thereof may be used to test the relative resistance of the materials to the respective enzyme treatment. Percent changes in area versus the total will be used to assess the relative amount of materials remaining after treatment with a particular enzyme. Materials having a percent recovery of at least 10%, preferably at least 50, 60, 70, 80, 90, 95 or 100% will be considered "resistant" to the respective enzyme treatment.

The phrase "aqueous composition" herein refers to a solution or mixture in which the solvent is at least about 1% by weight of water and which comprises the poly alpha-1,6-glucan derivative.

The terms "hydrocolloid" and "hydrogel" are used interchangeably herein. A hydrocolloid refers to a colloid system in which water is the dispersion medium. A "colloid" herein refers to a substance that is microscopically dispersed throughout another substance. Therefore, a hydrocolloid herein can also refer to a dispersion, emulsion, mixture, or solution of the poly alpha-1,6-glucan derivative in water or aqueous solution.

The term "aqueous solution" herein refers to a solution in which the solvent is water. The poly alpha-1,6-glucan derivative can be dispersed, mixed, and/or dissolved in an aqueous solution. An aqueous solution can serve as the dispersion medium of a hydrocolloid herein.

The terms "dispersant" and "dispersion agent" are used interchangeably herein to refer to a material that promotes the formation and stabilization of a dispersion of one substance in another. A "dispersion" herein refers to an aqueous composition comprising one or more particles, for example, any ingredient of a household product that are scattered, or uniformly distributed, throughout the aqueous composition. It is believed that the poly alpha-1,6-glucan derivative can act as dispersants in aqueous compositions disclosed herein.

The term "viscosity" as used herein refers to the measure of the extent to which a fluid or an aqueous composition such as a hydrocolloid resists a force tending to cause it to flow. Various units of viscosity that can be used herein include centipoise (cps) and Pascal-second (Pa·s). A centipoise is one one-hundredth of a poise; one poise is equal to $0.100\ kg \cdot m^{-1} \cdot s^{-1}$. Thus, the terms "viscosity modifier" and "viscosity-modifying agent" as used herein refer to anything that can alter/modify the viscosity of a fluid or aqueous composition.

The terms "fabric", "textile", and "cloth" are used interchangeably herein to refer to a woven or non-woven material having a network of natural and/or artificial fibers. Such fibers can be thread or yarn, for example.

A "fabric care composition" herein is any composition suitable for treating fabric in some manner. Suitable examples of such a composition include non-laundering fiber treatments (for desizing, scouring, mercerizing, bleaching, coloration, dying, printing, bio-polishing, anti-microbial treatments, anti-wrinkle treatments, stain resistance treatments, etc.), laundry care compositions (e.g., laundry care detergents), and fabric softeners.

The terms "detergent composition", "heavy duty detergent" and "all-purpose detergent" are used interchangeably herein to refer to a composition useful for regular washing of a substrate, for example, dishware, cutlery, vehicles, fabrics, carpets, apparel, white and colored textiles at any temperature. Detergent compositions for treating of fabrics, hard surfaces and any other surfaces in the area of fabric and home care, include: laundry detergents, fabric conditioners (including softeners), laundry and rinse additives and care compositions, fabric freshening compositions, laundry prewash, laundry pretreat, hard surface treatment compositions, car care compositions, dishwashing compositions (including hand dishwashing and automatic dishwashing products), air care products, detergent contained on or in a porous substrate or nonwoven sheet, and other cleaner products for consumer or institutional use.

The terms "cellulase" and "cellulase enzyme" are used interchangeably herein to refer to an enzyme that hydrolyzes β-1,4-D-glucosidic linkages in cellulose, thereby partially or completely degrading cellulose. Cellulase can alternatively be referred to as "β-1,4-glucanase", for example, and can have endocellulase activity (EC 3.2.1.4), exocellulase activity (EC 3.2.1.91), or cellobiase activity (EC 3.2.1.21). A cellulase in certain embodiments herein can also hydrolyze β-1,4-D-glucosidic linkages in cellulose ether derivatives such as carboxymethyl cellulose. "Cellulose" refers to an insoluble polysaccharide having a linear chain of β-1,4-linked D-glucose monomeric units.

As used herein, the term "fabric hand" or "handle" is meant people's tactile sensory response towards fabric which may be physical, physiological, psychological, social or any combination thereof. In some embodiments, the fabric hand may be measured using a PHABROMETER® System (available from Nu Cybertek, Inc. Davis, California)

for measuring the relative hand value as given by the American Association of Textile Chemists and Colorists (AATCC test method "202-2012, Relative Hand Value of Textiles: Instrumental Method").

The composition can be in the form of a liquid, a gel, a powder, a hydrocolloid, an aqueous solution, a granule, a tablet, a capsule, a single compartment sachet, a multi-compartment sachet, a single compartment pouch, or a multi-compartment pouch. In some embodiments, the composition is in the form of a liquid, a gel, a powder, a single compartment sachet, or a multi-compartment sachet.

In some embodiments, compositions comprising a poly alpha-1,6-glucan derivative as disclosed herein can be in the form of a fabric care composition. A fabric care composition can be used for hand wash, machine wash and/or other purposes such as soaking and/or pretreatment of fabrics, for example. A fabric care composition may take the form of, for example, a laundry detergent; fabric conditioner; any wash-, rinse-, or dryer-added product; unit dose or spray. Fabric care compositions in a liquid form may be in the form of an aqueous composition. In other embodiments, a fabric care composition can be in a dry form such as a granular detergent or dryer-added fabric softener sheet. Other non-limiting examples of fabric care compositions can include: granular or powder-form all-purpose or heavy-duty washing agents; liquid, gel or paste-form all-purpose or heavy-duty washing agents; liquid or dry fine-fabric (e.g. delicates) detergents; cleaning auxiliaries such as bleach additives, "stain-stick", or pre-treatments; substrate-laden products such as dry and wetted wipes, pads, or sponges; sprays and mists; water-soluble unit dose articles.

The composition can be in any useful form, for example, as powders, granules, pastes, bars, unit dose, or liquid.

The unit dose form may be water-soluble, for example, a water-soluble unit dose article comprising a water-soluble film and a liquid or solid laundry detergent composition, also referred to as a pouch. A water-soluble unit dose pouch comprises a water-soluble film which fully encloses the liquid or solid detergent composition in at least one compartment. The water-soluble unit dose article may comprise a single compartment or multiple compartments. The water-soluble unit dose article may comprise at least two compartments or at least three compartments. The compartments may be arranged in a superposed orientation or in a side-by-side orientation.

A unit dose article is typically a closed structure, made of the water-soluble film enclosing an internal volume which comprises the liquid or solid laundry detergent composition. The pouch can be of any form and shape which is suitable to hold and protect the composition, e.g. without allowing the release of the composition from the pouch prior to contact of the pouch to water.

A solid unit dose article is typically a closed structure, made of water-soluble fibers enclosing detergent particles and other detergent actives interdispersed between fibers to yield a solid laundry detergent composition pad. In another example the solid unit dose article sachet or pouch can comprise a pouch of soluble fibers can be of any form and shape which is suitable to hold and protect the composition, e.g. without allowing the release of the composition from the pouch prior to contact of the sachet or pouch to water.

The composition may be in the form of a solid, preferably in the form of particles, such as a pastille or bead. Suitable particles may comprise the poly alpha-1,6-glucan ether compound dispersed in a water-soluble carrier. Individual particles may have a mass from about 1 mg to about 1 g. The water-soluble carrier may be a water-soluble polymer. The water-soluble carrier may be selected from the group consisting of polyethylene glycol, sodium acetate, sodium bicarbonate, sodium chloride, sodium silicate, polypropylene glycol polyoxoalkylene, polyethylene glycol fatty acid ester, polyethylene glycol ether, sodium sulfate, starch, and mixtures thereof. The composition may comprise from about 25% to about 99.99% by weight of the water-soluble carrier, and from about 0.01% to about 30% by weight of the poly alpha-1,6-glucan ether compound. The particles may further comprise an additional benefit agent, such as a poly alpha-1,6-glucan derivative, a surfactant, a perfume, a conditioning agent (e.g., a quaternary ammonium compound and/or a silicone), or mixtures thereof. The particles may be first particles and may be part of a plurality of particles that further comprise second particles. The plurality of particles may include first particles and second particles, where the particles that comprise the poly alpha-1,6-glucan ether compound are the first particles, and wherein the second particles comprise a different benefit agent, such as perfume, which may be unencapsulated perfume, encapsulated perfume, or a mixture thereof. The particles may be used in combination with a detergent composition, for example concurrently during a wash cycle, or subsequently during a rinse cycle.

A liquid detergent composition may be aqueous, typically containing up to about 70% by weight of water and 0% to about 30% by weight of organic solvent. It may also be in the form of a compact gel type containing less than or equal to 30% by weight water.

The poly alpha-1,6-glucan derivatives disclosed herein can be used as an ingredient in the desired product or may be blended with one or more additional suitable ingredients and used as, for example, fabric care applications, laundry care applications, and/or dish care applications. Any of the disclosed compositions, for example, a fabric care, a laundry care, or a dish care composition can comprise in the range of 0.01 to 99 percent by weight of the poly alpha-1,6-glucan derivative, based on the total weight of the composition. The composition may comprise 0.1 to 10% or 0.1 to 9% or 0.5 to 8% or 1 to 7% or 1 to 6% or 1 to 5% or 1 to 4% or 1 to 3% or 5 to 10% or 10 to 15% or 15 to 20% or 20 to 25% or 25 to 30% or 30 to 35% or 35 to 40% or 40 to 45% or 45 to 50% or 50 to 55% or 55 to 60% or 60 to 65% or 65 to 70% or 70 to 75% or 75 to 80% or 80 to 85% or 85 to 90% or 90 to 95% or 95 to 99% by weight of the poly alpha-1,6-glucan derivative, wherein the percentages by weight are based on the total weight of the composition.

The composition can further comprise at least one of a surfactant, an enzyme, a detergent builder, a complexing agent, a polymer, a soil release polymer, a surfactancy-boosting polymer, a bleaching agent, a bleach activator, a bleaching catalyst, a fabric conditioner, a clay, a foam booster, a suds suppressor, an anti-corrosion agent, a soil-suspending agent, an anti-soil re-deposition agent, a dye, a bactericide, a tarnish inhibitor, an optical brightener, a perfume, a saturated or unsaturated fatty acid, a dye transfer inhibiting agent, a chelating agent, a hueing dye, a calcium cation, a magnesium cation, a visual signaling ingredient, an anti-foam, a structurant, a thickener, an anti-caking agent, a starch, sand, a gelling agents, or any combination thereof. The enzyme may be a cellulase, a protease, an amylase, a lipase, or any combination thereof.

The composition can be a detergent composition useful for, for example, fabric care, laundry care and/or dish care and may further contain one or more active enzymes. Non-limiting examples of suitable enzymes include proteases, cellulases, hemicellulases, peroxidases, lipolytic enzymes (e.g., metallolipolytic enzymes), xylanases, lipases, phospholipases, esterases (e.g., arylesterase, polyesterase), perhydrolases, cutinases, pectinases, pectate lyases, mannanases, keratinases, reductases, oxidases (e.g., choline oxidase), phenoloxidases, lipoxygenases, ligninases, pullulanases, tannases, pentosanases, malanases, beta-glucanases, arabinosidases, hyaluronidases, chondroitinases, laccases, metalloproteinases, amadoriases, glucoamylases, arabinofuranosidases, phytases, isomerases, transferases, amylases or any combination thereof. If an enzyme(s) is included, it may be present in the composition at about 0.0001 to 0.1% by weight of the active enzyme, based on the total weight of the composition. In other embodiments, the enzyme can be present at about 0.01 to 0.03% by weight of the active enzyme (e.g., calculated as pure enzyme protein) based on the total weight of the composition. In some embodiments, a combination of two or more enzymes can be used in the composition. In some embodiments, the two or more enzymes are cellulase and one or more of proteases, hemicellulases, peroxidases, lipolytic enzymes, xylanases, lipases, phospholipases, esterases, perhydrolases, cutinases, pectinases, pectate lyases, mannanases, keratinases, reductases, oxidases, phenoloxidases, lipoxygenases, ligninases, pullulanases, tannases, pentosanases, malanases, beta-glucanases, arabinosidases, hyaluronidases, chondroitinases, laccases, metalloproteinases, amadoriases, glucoamylases, arabinofuranosidases, phytases, isomerases, transferases, amylases or any combination thereof.

In some embodiments, the composition can comprise one or more enzymes, each enzyme present from about 0.00001% to about 10% by weight, based on the total weight of the composition. In some embodiments, the composition can also comprise each enzyme at a level of about 0.0001% to about 10%, about 0.001% to about 5%, about 0.001% to about 2% or about 0.005% to about 0.5% by weight, based on the total weight of the composition.

A cellulase can have endocellulase activity (EC 3.2.1.4), exocellulase activity (EC 3.2.1.91), or cellobiase activity (EC 3.2.1.21). A cellulase is an "active cellulase" having activity under suitable conditions for maintaining cellulase activity; it is within the skill of the art to determine such suitable conditions. Besides being able to degrade cellulose, a cellulase in certain embodiments can also degrade cellulose ether derivatives such as carboxymethyl cellulose.

The cellulase may be derived from any microbial source, such as a bacteria or fungus. Chemically-modified cellulases or protein-engineered mutant cellulases are included. Suitable cellulases include, for example, cellulases from the genera *Bacillus, Pseudomonas, Streptomyces, Trichoderma, Humicola, Fusarium, Thielavia* and *Acremonium*. As other examples, the cellulase may be derived from *Humicola insolens, Myceliophthora thermophile, Fusarium oxysporum, Trichoderma reesei* or any combination thereof. The cellulase, such as any of the foregoing, can be in a mature form lacking an N-terminal signal peptide. Commercially available cellulases useful herein include CELLUSOFT®, CELLUCLEAN®, CELLUZYME® and CAREZYME® (Novozymes A/S); CLAZINASE® and PURADAX® HA and REVITALENZ™ (DuPont Industrial Biosciences), BIOTOUCH® (AB Enzymes); and KAC-500(B)® (Kao Corporation).

Alternatively, a cellulase herein may be produced by any means known in the art, for example, a cellulase may be produced recombinantly in a heterologous expression system, such as a microbial or fungal heterologous expression system. Examples of heterologous expression systems include bacterial (e.g., *E. coli, Bacillus* sp.) and eukaryotic systems. Eukaryotic systems can employ yeast (e.g., *Pichia* sp., *Saccharomyces* sp.) or fungal (e.g., *Trichoderma* sp. such as *T. reesei, Aspergillus* species such as *A. niger*) expression systems, for example.

The cellulase in certain embodiments can be thermostable. Cellulase thermostability refers to the ability of the enzyme to retain activity after exposure to an elevated temperature (e.g. about 60-70° C.) for a period of time (e.g., about 30-60 minutes). The thermostability of a cellulase can be measured by its half-life (t1/2) given in minutes, hours, or days, during which time period half the cellulase activity is lost under defined conditions.

The cellulase in certain embodiments can be stable to a wide range of pH values (e.g. neutral or alkaline pH such as pH of ~7.0 to ~11.0). Such enzymes can remain stable for a predetermined period of time (e.g., at least about 15 min., 30 min., or 1 hour) under such pH conditions.

At least one, two, or more cellulases may be included in the composition. The total amount of cellulase in a composition herein typically is an amount that is suitable for the purpose of using cellulase in the composition (an "effective amount"). For example, an effective amount of cellulase in a composition intended for improving the feel and/or appearance of a cellulose-containing fabric is an amount that produces measurable improvements in the feel of the fabric (e.g., improving fabric smoothness and/or appearance, removing pills and fibrils which tend to reduce fabric appearance sharpness). As another example, an effective amount of cellulase in a fabric stonewashing composition herein is that amount which will provide the desired effect (e.g., to produce a worn and faded look in scams and on fabric panels). The amount of cellulase in a composition herein can also depend on the process parameters in which the composition is employed (e.g., equipment, temperature, time, and the like) and cellulase activity, for example. The effective concentration of cellulase in an aqueous composition in which a fabric is treated can be readily determined by a skilled artisan. In fabric care processes, cellulase can be present in an aqueous composition (e.g., wash liquor) in which a fabric is treated in a concentration that is minimally about 0.01-0.1 ppm total cellulase protein, or about 0.1-10 ppb total cellulase protein (e.g., less than 1 ppm), to maximally about 100, 200, 500, 1000, 2000, 3000, 4000, or 5000 ppm total cellulase protein, for example.

Suitable enzymes are known in the art and can include, for example, MAXATASE®, MAXACAL™, MAXAPEM™, OPTICLEAN®, OPTIMASE®, PROPERASE®, PURAFECT®, PURAFECT® OXP, PURAMAX™, EXCELLASE™, PREFERENZ™ proteases (e.g. P100, P110, P280), EFFECTENZ™ proteases (e.g. P1000, P1050, P2000), EXCELLENZ™ proteases (e.g. P1000), ULTIMASE®, and PURAFAST™ (Genencor); ALCALASE®, SAVINASE®, PRIMASE®, DURAZYM™, POLARZYME®, OVOZYME®, KANNASE®, LIQUANASE®, NEUTRASE®, RELASE® and ESPERASE® (Novozymes); BLAP™ and BLAP™ variants (Henkel Kommanditgesellschaft auf Aktien, Duesseldorf, Germany), and KAP (*B. alkalophilus* subtilisin; Kao Corp., Tokyo, Japan) proteases; MANNASTAR®, PURABRITE™, and MANNAWAY® mannanases; M1 LIPASE™, LUMA FAST™, and LIPOMAX™ (Genencor); LIPEX®, LIPOLASE® and LIPOLASE® ULTRA (Novozymes); and LIPASE P™ "Amano" (Amano Pharmaceutical Co. Ltd., Japan) lipases; STAINZYME®, STAINZYME PLUS®, NATALASE®, DURAMYL®, TERMAMYL®, TERMAMYL ULTRA®, FUNGAMYL® and BAN™ (Novo Nordisk A/S and Novozymes A/S); RAPIDASE®, POWERASE®, PURASTAR® and PREFERENZ™ (DuPont Industrial Biosciences) amylases; GUARDZYME™ (Novo Nordisk A/S and Novozymes A/S) peroxidases or any combination thereof.

The enzymes in the composition can be stabilized using conventional stabilizing agents, e.g., a polyol such as propylene glycol or glycerol; a sugar or sugar alcohol; lactic acid; boric acid or a boric acid derivative (e.g., an aromatic borate ester).

A detergent composition herein typically comprises one or more surfactants, wherein the surfactant is selected from nonionic surfactants, anionic surfactants, cationic surfactants, ampholytic surfactants, zwitterionic surfactants, semi-polar nonionic surfactants and mixtures thereof. The surfactant may be petroleum-derived (also referred to as synthetic) or non-petroleum-derived (also referred to as natural). In some embodiments, the surfactant is present at a level of from about 0.1% to about 60%, while in alternative embodiments the level is from about 1% to about 50%, while in still further embodiments the level is from about 5% to about 40%, by weight of the cleaning composition. A detergent will usually contain 0% to about 50% by weight of an anionic surfactant such as linear alkylbenzenesulfonate (LAS), alpha-olefinsulfonate (AOS), alkyl sulfate (fatty alcohol sulfate) (AS), alcohol ethoxysulfate (AEOS or AES), secondary alkanesulfonates (SAS), alpha-sulfo fatty acid methyl esters, alkyl- or alkenylsuccinic acid, or soap.

The detergent composition may comprise an alcohol ethoxysulfate of the formula $R^1$—$(OCH_2CH_2)_x$—O—$SO_3M$, wherein $R^1$ is a non-petroleum derived, linear or branched fatty alcohol consisting of even numbered carbon chain lengths of from about $C_8$ to about $C_{20}$, and wherein x is from about 0.5 to about 8, and where M is an alkali metal or ammonium cation. The fatty alcohol portion of the alcohol ethoxysulfate ($R^1$) is derived from a renewable source (e.g., animal or plant derived) rather than geologically derived (e.g., petroleum-derived). Fatty alcohols derived from a renewable source may be referred to as natural fatty alcohols. Natural fatty alcohols have an even number of carbon atoms with a single alcohol (—OH) attached to the terminal carbon. The fatty alcohol portion of the surfactant ($R^1$) may comprise distributions of even number carbon chains, e.g., C12, C14, C16, C18, and so forth.

In addition, a detergent composition may optionally contain 0 wt % to about 40 wt % of a nonionic surfactant such as alcohol ethoxylate (AEO or AE), carboxylated alcohol ethoxylates, nonylphenol ethoxylate, alkylpolyglycoside, alkyldimethylamineoxide, ethoxylated fatty acid monoethanolamide, fatty acid monocthanolamide, or polyhydroxy alkyl fatty acid amide. The detergent composition may comprise an alcohol ethoxylate of formula $R^2$—$(OCH_2CH_2)_y$—OH, wherein $R^2$ is a non-petroleum derived, linear or branched fatty alcohol consisting of even numbered carbon chain lengths of from about $C_{10}$ to about $C_{18}$, and wherein y is from about 0.5 to about 15. The fatty alcohol portion of the alcohol ethoxylate ($R^2$) is derived from a renewable source (e.g., animal or plant derived) rather than geologically derived (e.g., petroleum-derived). The fatty alcohol portion of the surfactant (R2) may comprise distributions of even number carbon chains, e.g., C12, C14, C16, C18, and so forth.

The composition can further comprise one or more detergent builders or builder systems. In some embodiments incorporating at least one builder, the compositions comprise at least about 1%, from about 3% to about 60% or from about 5% to about 40% by weight of the builder, based on the total weight of the composition. Builders include, for example, the alkali metal, ammonium and/or alkanolammonium salts of polyphosphates, alkali metal silicates, alkaline earth and alkali metal carbonates, aluminosilicates, polycarboxylate compounds, ether hydroxypolycarboxylates, copolymers of maleic anhydride with ethylene or vinyl methyl ether, 1,3,5-trihydroxy benzene-2,4,6-trisulphonic acid, and carboxymethyloxysuccinic acid, the various alkali metal, ammonium and substituted ammonium salts of polyacetic acids such as ethylenediamine tetraacetic acid and nitrilotriacetic acid, as well as polycarboxylates such as mellitic acid, succinic acid, citric acid, oxydisuccinic acid, polymaleic acid, benzene 1,3,5-tricarboxylic acid, carboxymethyloxysuccinic acid, and soluble salts thereof. Examples of a detergent builder or complexing agent include zeolite, diphosphate, triphosphate, phosphonate, citrate, nitrilotriacetic acid (NTA), ethylenediaminetetraacetic acid (EDTA), diethylenetriaminepentaacetic acid (DTMPA), alkyl- or alkenylsuccinic acid, soluble silicates or layered silicates (e.g., SKS-6 from Hoechst). A detergent may also be unbuilt, i.e., essentially free of detergent builder.

The composition can further comprise at least one chelating agent. Suitable chelating agents include, for example, copper, iron and/or manganese chelating agents and mixtures thereof. In some embodiments in which at least one chelating agent is used, the compositions comprise from about 0.1% to about 15% or even from about 3% to about 10% by weight of the chelating agent, based on the total weight of the composition.

The composition can further comprise at least one deposition aid. Suitable deposition aids include, for example, polyethylene glycol, polypropylene glycol, polycarboxylate, soil release polymers such as polyterephthalic acid, clays such as kaolinite, montmorillonite, atapulgite, illite, bentonite, halloysite, or any combination thereof.

The composition can further comprise one or more dye transfer inhibiting agents. Suitable dye transfer inhibiting agents include, for example, polyvinylpyrrolidone polymers, polyamine N-oxide polymers, copolymers of N-vinylpyrrolidone and N-vinylimidazole, polyvinyloxazolidones, polyvinylimidazoles, manganese phthalocyanine, peroxidases, polyvinylpyrrolidone polymers, ethylene-diamine-tetraacetic acid (EDTA); diethylene triamine penta methylene phosphonic acid (DTPMP); hydroxy-ethane diphosphonic acid (HEDP); ethylenediamine N,N'-disuccinic acid (EDDS); methyl glycine diacetic acid (MGDA); diethylene triamine penta acetic acid (DTPA); propylene diamine tetraacetic acid (PDT A); 2-hydroxypyridine-N-oxide (HPNO); or methyl glycine diacetic acid (MGDA); glutamic acid N,N-diacetic acid (N,N-dicarboxymethyl glutamic acid tetrasodium salt (GLDA); nitrilotriacetic acid (NTA); 4,5-dihydroxy-m-benzenedisulfonic acid; citric acid and any salts thereof; N-hydroxyethylethylenediaminetri-acetic acid (HEDTA), triethylenetetraaminehexaacetic acid (TTHA), N-hydroxyethyliminodiacetic acid (HEIDA), dihydroxyethylglycine (DHEG), ethylenediaminetetrapropionic acid (EDTP) and derivatives thereof or any combination thereof. In embodiments in which at least one dye transfer inhibiting agent is used, the compositions can comprise from about 0.0001% to about 10%, from about 0.01% to about 5%, or even from about 0.1% to about 3% by weight of the dye transfer inhibiting agent, based on the total weight of the composition.

The composition can further comprise silicates. Suitable silicates can include, for example, sodium silicates, sodium disilicate, sodium metasilicate, crystalline phyllosilicates or any combination thereof. In some embodiments, silicates can be present at a level of from about 1% to about 20% by weight, based on the total weight of the composition. In other embodiments, silicates can be present at a level of from about 5% to about 15% by weight, based on the total weight of the composition.

The composition can further comprise dispersants. Suitable water-soluble organic materials can include, for example, homo- or co-polymeric acids or their salts, in which the polycarboxylic acid comprises at least two carboxyl radicals separated from each other by not more than two carbon atoms.

The composition can further comprise one or more other types of polymers in addition to the present poly alpha-1,6-glucan derivatives. Examples of other types of polymers useful herein include carboxymethyl cellulose (CMC), poly (vinylpyrrolidone) (PVP), polyethylene glycol (PEG), poly (vinyl alcohol) (PVA), polycarboxylates such as polyacrylates, maleic/acrylic acid copolymers and lauryl methacrylate/acrylic acid copolymers.

The composition can further comprise a bleaching system. For example, the bleaching system can comprise an $H_2O_2$ source such as perborate, percarbonate, perhydrate salts, mono or tetra hydrate sodium salt of perborate, persulfate, perphosphate, persilicate, percarboxylic acids and salts, percarbonic acids and salts, perimidic acids and salts, peroxymonosulfuric acids and salts, sulfonated zinc phthalocyanines, sulfonated aluminum phthalocyanines, xanthene dyes which may be combined with a peracid-forming bleach activator such as, for example, dodecanoyl oxybenzene sulfonate, decanoyl oxybenzene sulfonate, decanoyl oxybenzoic acid or salts thereof, tetraacetylethylenediamine (TAED) or nonanoyloxybenzenesulfonate (NOBS). Alternatively, a bleaching system may comprise peroxyacids (e.g., amide, imide, or sulfone type peroxyacids). In other embodiments, the bleaching system can be an enzymatic bleaching system comprising perhydrolase. Combinations of any of the above may also be used.

The composition can further comprise conventional detergent ingredients such as fabric conditioners, clays, foam boosters, suds suppressors, anti-corrosion agents, soil-suspending agents, anti-soil redeposition agents, dyes, bactericides, tarnish inhibiters, optical brighteners, or perfumes. The pH of a detergent composition herein (measured in aqueous solution at use concentration) can be neutral or alkaline (e.g., pH of about 7.0 to about 11.0).

The composition can be a detergent composition and optionally, a heavy duty (all purpose) laundry detergent composition. In some embodiments, the detergent composition can comprise a detersive surfactant (10%-40% wt/wt), including an anionic detersive surfactant (selected from a group of linear or branched or random chain, substituted or unsubstituted alkyl sulphates, alkyl sulphonates, alkyl alkoxylated sulphate, alkyl phosphates, alkyl phosphonates, alkyl carboxylates, and/or mixtures thereof), and optionally non-ionic surfactant (selected from a group of linear or branched or random chain, substituted or unsubstituted alkyl alkoxylated alcohol, e.g., $C_8$-$C_{18}$ alkyl ethoxylated alcohols and/or $C_6$-$C_{12}$ alkyl phenol alkoxylates), where the weight ratio of anionic detersive surfactant (with a hydrophilic index (HIc) of from 6.0 to 9) to non-ionic detersive surfactant is greater than 1:1. Suitable detersive surfactants also include cationic detersive surfactants (selected from a group of alkyl pyridinium compounds, alkyl quaternary ammonium compounds, alkyl quaternary phosphonium compounds, alkyl ternary sulphonium compounds, and/or mixtures thereof); zwitterionic and/or amphoteric detersive surfactants (selected from a group of alkanolamine sulphobetaines); ampholytic surfactants; semi-polar non-ionic surfactants and mixtures thereof.

The composition can be a detergent composition, optionally including, for example, a surfactancy boosting polymer consisting of amphiphilic alkoxylated grease cleaning polymers. Suitable amphiphilic alkoxylated grease cleaning polymers can include, for example, alkoxylated polymers having branched hydrophilic and hydrophobic properties, such as alkoxylated polyalkylenimines, random graft polymers comprising a hydrophilic backbone comprising monomers, for example, unsaturated $C_1$-$C_6$ carboxylic acids, ethers, alcohols, aldehydes, ketones, esters, sugar units, alkoxy units, maleic anhydride, saturated polyalcohols such as glycerol, and mixtures thereof; and hydrophobic side chain(s), for example, one or more $C_4$-$C_{25}$ alkyl groups, polypropylene, polybutylene, vinyl esters of saturated $C_1$-$C_6$ mono-carboxylic acids, $C_1$-$C_6$ alkyl esters of acrylic or methacrylic acid, and mixtures thereof.

Suitable heavy duty laundry detergent compositions can optionally include additional polymers such as soil release polymers (include anionically end-capped polyesters, for example SRP1, polymers comprising at least one monomer unit selected from saccharide, dicarboxylic acid, polyol and combinations thereof, in random or block configuration, ethylene terephthalate-based polymers and co-polymers thereof in random or block configuration, for example REPEL-O-TEX SF, SF-2 AND SRP6, TEXCARE SRA100, SRA300, SRN100, SRN170, SRN240, SRN260, SRN300 AND SRN325, MARLOQUEST SL), anti-redeposition polymers, include carboxylate polymers, such as polymers comprising at least one monomer selected from acrylic acid, maleic acid (or maleic anhydride), fumaric acid, itaconic acid, aconitic acid, mesaconic acid, citraconic acid, methylenemalonic acid, and any mixture thereof, vinylpyrrolidone homopolymer, and/or polyethylene glycol, molecular weight in the range of from 500 to 100,000 Daltons (Da); and polymeric carboxylate (such as maleate/acrylate random copolymer or polyacrylate homopolymer). If present, soil release polymers can be included at 0.1 to 10% by weight, based on the total weight of the composition.

The heavy duty laundry detergent composition can optionally further include saturated or unsaturated fatty acids, preferably saturated or unsaturated $C_{12}$-$C_{24}$ fatty acids; deposition aids, for example, polysaccharides, cellulosic polymers, poly diallyl dimethyl ammonium halides (DADMAC), and co-polymers of DADMAC with vinyl pyrrolidone, acrylamides, imidazoles, imidazolinium halides, and mixtures thereof, in random or block configuration, cationic guar gum, cationic starch, cationic polyacylamides or any combination thereof. If present, the fatty acids and/or the deposition aids can each be present at 0.1% to 10% by weight, based on the total weight of the composition.

The detergent composition may optionally include silicone or fatty-acid based suds suppressors; hueing dyes, calcium and magnesium cations, visual signaling ingredients, anti-foam (0.001% to about 4.0% by weight, based on the total weight of the composition), and/or a structurant/thickener (0.01% to 5% by weight, based on the total weight of the composition) selected from the group consisting of diglycerides and triglycerides, ethylene glycol distearate, microcrystalline cellulose, microfiber cellulose, biopolymers, xanthan gum, gellan gum, and mixtures thereof).

The compositions disclosed herein can be in the form of a dishwashing detergent composition. Examples of dishwashing detergents include automatic dishwashing detergents (typically used in dishwasher machines) and hand-washing dish detergents. A dishwashing detergent composition can be in any dry or liquid/aqueous form as disclosed herein, for example. Components that may be included in certain embodiments of a dishwashing detergent composition include, for example, one or more of a phosphate; oxygen- or chlorine-based bleaching agent; non-ionic surfactant; alkaline salt (e.g., metasilicates, alkali metal hydroxides, sodium carbonate); any active enzyme disclosed herein; anti-corrosion agent (e.g., sodium silicate); anti-foaming agent; additives to slow down the removal of glaze and patterns from ceramics; perfume; anti-caking agent (in granular detergent); starch (in tablet-based detergents); gelling agent (in liquid/gel based detergents); and/or sand (powdered detergents).

In addition to the poly alpha-1,6-glucan derivative, dishwashing detergent compositions can comprise (i) a non-ionic surfactant, including any ethoxylated non-ionic surfactant, alcohol alkoxylated surfactant, epoxy-capped poly (oxyalkylated) alcohol, or amine oxide surfactant present in an amount from 0 to 10% by weight; (ii) a builder, in the range of about 5 to 60% by weight, including any phosphate builder (e.g., mono-phosphates, di-phosphates, tri-polyphosphates, other oligomeric-polyphosphates, sodium tripolyphosphate-STPP), any phosphate-free builder (e.g., amino acid-based compounds including methyl-glycine-diacetic acid [MGDA] and salts or derivatives thereof, glutamic-N, N-diacetic acid [GLDA] and salts or derivatives thereof, iminodisuccinic acid (IDS) and salts or derivatives thereof, carboxy methyl inulin and salts or derivatives thereof, nitrilotriacetic acid [NTA], diethylene triamine penta acetic acid [DTPA], B-alaninediacetic acid [B-ADA] and salts thereof), homopolymers and copolymers of poly-carboxylic acids and partially or completely neutralized salts thereof, monomeric polycarboxylic acids and hydroxycarboxylic acids and salts thereof in the range of 0.5 to 50% by weight, or sulfonated/carboxylated polymers in the range of about 0.1% to about 50% by weight; (iii) a drying aid in the range of about 0.1% to about 10% by weight (e.g., polyesters, especially anionic polyesters, optionally together with further monomers with 3 to 6 functionalities, for example, acid, alcohol or ester functionalities which are conducive to polycondensation, polycarbonate-, polyurethane- and/or polyurea-polyorganosiloxane compounds or precursor compounds thereof, particularly of the reactive cyclic carbonate and urea type); (iv) a silicate in the range from about 1% to about 20% by weight (e.g., sodium or potassium silicates such as sodium disilicate, sodium meta-silicate and crystalline phyllosilicates); (v) an inorganic bleach (e.g., perhydrate salts such as perborate, percarbonate, perphosphate, persulfate and persilicate salts) and/or an organic bleach, for example, organic peroxyacids such as diacyl- and tetraacylperoxides, especially diproxydodecanedioic acid, diperoxytetradecanedioic acid, and diperoxyhexadecanedioic acid; (vi) a bleach activator, for example, organic peracid precursors in the range from about 0.1% to about 10% by weight and/or bleach catalyst (e.g., manganese triazacyclononane and related complexes; Co, Cu, Mn, and Fe bispyridylamine and related complexes; and pentamine acetate cobalt(III) and related complexes); (vii) a metal care agent in the range from about 0.1% to 5% by weight, for example, benzatriazoles, metal salts and complexes, and/or silicates; and/or (viii) any active enzyme disclosed herein in the range from about 0.01 to 5.0 mg of active enzyme per gram of automatic dishwashing detergent composition, and an enzyme stabilizer component. The percentages by weight are based on the total weight of the composition.

In other embodiments, the disclosure relates to a method for treating a substrate, the method comprising the steps: (A) providing a composition comprising a poly alpha-1,6-glucan derivative, the derivative comprising: (i) poly alpha-1,6-glucan substituted with at least one organic group linked to the poly alpha-1,6-glucan through a

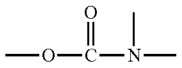

linkage moiety; (ii) a weight average degree of polymerization of at least 5; and (iii) a degree of substitution of about 0.001 to about 3.00; wherein the poly alpha-1,6-glucan comprises a backbone of glucose monomer units wherein greater than or equal to 40% of the glucose monomer units are linked via alpha-1,6-glycosidic linkages, and wherein from 0% to less than 30% of the glucose monomer units are linked via alpha-1,3 glycosidic linkages, and optionally at least 5% of the backbone glucose monomer units have branches via alpha-1,2- and/or alpha-1,3-glycosidic linkages; (B) contacting the substrate with the composition; and (C) optionally rinsing the substrate; wherein the substrate is, for example, a textile, a fabric, carpet, upholstery, apparel, or a surface. Optionally, the step of contacting the substrate can be performed in the presence of water. The compositions comprising a poly alpha-1,6-glucan derivative are as disclosed herein.

In one embodiment, the method of treating the substrate can impart anti-greying properties to the substrate, by which is meant that soil which is detached from a fabric during washing of the fabric is suspended in the wash liquor and thus prevented from being redeposited on the fabric. In another embodiment, the method of treating the substrate can impart anti-redeposition properties to a substrate. The effectiveness of anti-greying and anti-redeposition agents can be determined with the use of a tergotometer and multiple washings of pre-soiled fabrics in the presence of initially clean fabrics which act as redeposition monitors, for example using methods known in the art.

In one embodiment, the substrate can be a textile, a fabric, carpet, or apparel. In another embodiment, the substrate can be carpet, upholstery, or a surface. In yet another embodiment, the substrate can be a textile, a fabric, carpet, upholstery, apparel, or a surface. By "upholstery" is meant the soft, padded textile covering that is fixed to furniture such as armchairs and sofas. The treatment provides a benefit to the substrate, for example, one or more of improved fabric hand, improved resistance to soil deposition, improved colorfastness, improved wear resistance, improved wrinkle resistance, improved antifungal activity, improved stain resistance, improved cleaning performance when laundered, improved drying rates, improved dye, pigment or lake update, improved whiteness retention, or any combination thereof. The treatment provides a benefit to the substrate, for example improved resistance to soil deposition, improved stain resistance, improved cleaning performance, or any combination thereof.

A fabric herein can comprise natural fibers, synthetic fibers, semi-synthetic fibers, or any combination thereof. A semi-synthetic fiber is produced using naturally occurring material that has been chemically derivatized, an example of which is rayon. Non-limiting examples of fabric types herein include fabrics made of (i) cellulosic fibers such as cotton (e.g., broadcloth, canvas, chambray, chenille, chintz, corduroy, cretonne, damask, denim, flannel, gingham, jacquard, knit, matelassé, oxford, percale, poplin, plissé, sateen, seersucker, sheers, terry cloth, twill, velvet), rayon (e.g., viscose, modal, lyocell), linen, and TENCEL®; (ii) proteinaceous fibers such as silk, wool and related mammalian fibers; (iii) synthetic fibers such as polyester, acrylic, nylon, and the like; (iv) long vegetable fibers from jute, flax, ramie, coir, kapok, sisal, henequen, abaca, hemp and sunn; and (v) any combination of a fabric of (i)-(iv). Fabric comprising a combination of fiber types (e.g., natural and synthetic) includes those with both a cotton fiber and polyester, for example. Materials/articles containing one or more fabrics include, for example, clothing, curtains, drapes, upholstery, carpeting, bed linens, bath linens, tablecloths, sleeping bags, tents, car interiors, etc. Other materials comprising natural and/or synthetic fibers include, for example, non-woven fabrics, paddings, paper, and foams. Fabrics are typically of woven or knit construction.

The step of contacting can be performed at a variety of conditions, for example, times, temperatures, wash/rinse volumes. Methods for contacting a fabric or textile substrate, for example, a fabric care method or laundry method are generally well known. For example, a material comprising fabric can be contacted with the disclosed composition: (i) for at least about 5, 10, 20, 30, 40, 50, 60, 70, 80, 90, 100, 110, or 120 minutes; (ii) at a temperature of at least about 10, 15, 20, 25, 30, 35, 40, 45, 50, 55, 60, 65, 70, 75, 80, 85, 90, or 95° C. (e.g., for laundry wash or rinse: a "cold" temperature of about 15-30° C., a "warm" temperature of about 30-50° C., a "hot" temperature of about 50-95° C.); (iii) at a pH of about 2, 3, 4, 5, 6, 7, 8, 9, 10, 11, or 12 (e.g., pH range of about 2-12, or about 3-11); (iv) at a salt (e.g., NaCl) concentration of at least about 0.5, 1.0, 1.5, 2.0, 2.5, 3.0, 3.5, or 4.0% by weight; or any combination of (i)-(iv). The contacting step in a fabric care method or laundry method can comprise any of washing, soaking, and/or rinsing steps, for example. In some embodiments, the rinsing step is a step of rinsing with water.

Other substrates that can be contacted include, for example, surfaces that can be treated with a dish detergent (e.g., automatic dishwashing detergent or hand dish detergent). Examples of such materials include surfaces of dishes, glasses, pots, pans, baking dishes, utensils and flatware made from ceramic material, china, metal, glass, plastic (e.g., polyethylene, polypropylene, and polystyrene) and wood (collectively referred to herein as "tableware"). Examples of conditions (e.g., time, temperature, wash volume) for conducting a dishwashing or tableware washing method are known in the art. In other examples, a tableware article can be contacted with the composition herein under a suitable set of conditions such as any of those disclosed above with regard to contacting a fabric-comprising material.

Certain embodiments of a method of treating a substrate further comprise a drying step, in which a material is dried after being contacted with the composition. The drying step can be performed directly after the contacting step, or following one or more additional steps that might follow the contacting step, for example, drying of a fabric after being rinsed, in water for example, following a wash in an aqueous composition. Drying can be performed by any of several means known in the art, such as air drying at a temperature of at least about 30, 40, 50, 60, 70, 80, 90, 100, 120, 140, 160, 170, 175, 180, or 200° C., for example. A material that has been dried herein typically has less than 3, 2, 1, 0.5, or 0.1 wt % water comprised therein.

The treatment provides a benefit to the substrate, for example improved resistance to soil deposition, improved stain resistance, improved cleaning performance, or any combination thereof. The step of contacting can include wiping or spraying the substrate with the composition.

The following are preferred embodiments of the present invention:

1. A laundry care or dish care composition comprising a poly alpha-1,6-glucan derivative, wherein the poly alpha-1,6-glucan derivative comprises:
   (i) a poly alpha-1,6-glucan backbone of glucose monomer units, wherein greater than or equal to 40% of the glucose monomer units are linked via alpha-1,6 glycosidic linkages, and wherein from 0% to less than 30% of the glucose monomer units are linked via alpha-1,3 glycosidic linkages, and optionally at least 5% of the backbone glucose monomer units have branches via alpha-1,2 and/or alpha-1,3 glycosidic linkages; and
   (ii) at least one organic group linked to the poly alpha-1,6-glucan backbone through a

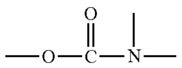

linkage moiety;
   wherein, the poly alpha-1,6-glucan backbone has a weight average degree of polymerization of at least 5; and
   wherein, the poly alpha-1,6-glucan derivative has a degree of substitution of

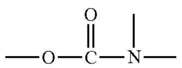

linkage moiety of from 0.001 to 3.00.
2. The composition of embodiment 1, wherein the organic group linked to the poly alpha-1,6-glucan backbone is a hydrophobic organic group.
3. The composition of any preceding embodiment, wherein the poly alpha-1,6-glucan derivative further comprises one or more additional hydrophobic organic groups linked to the poly alpha-1,6-glucan backbone through linkage moiety selected from one or more of ester (—OCO—), carbonate (—OCOO—), sulfonate ester (—$OSO_2$—), and ether (—O—).
4. The composition of any preceding embodiment, wherein the poly alpha-1,6-glucan derivative is substantially free of hydrophilic substitution.
5. The composition of any of claims 1-3, wherein the poly alpha-1,6-glucan derivative is substantially free from hydrophilic groups selected from: carboxylic acid, carboxylic acid salt, sulfonic acid derivative, sulfonic acid derivative salt, sulfuric acid derivative, sulfuric acid derivative salt, thiosulfate, thiosulfate salt, phosphoric acid derivative, phosphoric acid derivative salt, alkyl amine, alkyl substituted ammonium salt, quaternized pyridine salt, quaternized imidazole salt, or any combination thereof.
6. The composition of any preceding embodiment, wherein the alpha-1,6-glucan backbone of the poly alpha-1,6-glucan derivative has a weight average degree of polymerization of either from 5 to 95, or from 125 to 4000.

7. The composition of any preceding embodiment, wherein, the poly alpha-1,6-glucan derivative has a degree of substitution of

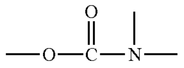

linkage moiety of from 0.40 to 0.90.

8. The composition of any preceding embodiment, wherein either from 5% to 9%, or from 26% to 40% of the backbone glucose monomer units have branches via alpha-1,2 or alpha-1,3 glycosidic linkages.

9. The composition of any of claims 1, 3 and 6-8, wherein the organic group is selected from: a $C_1$ to $C_{18}$ alkyl group; a hydroxy alkyl group; a $C_2$ to $C_{18}$ alkenyl group; a $C_2$ to $C_{18}$ alkynyl group; a benzyl group; a $C_6$ to $C_{20}$ aryl group; a polyether comprising repeat units of ($-CH_2CH_2O-$) and/or ($-CH_2CH(CH_3)O-$) wherein the total number of repeat units is in the range of 2 to 100; or any combination thereof.

10. The composition of any of claims 1, 3 and 6-8, wherein the organic group is selected from: a $C_1$-$C_{10}$ alkyl group; a $C_1$-$C_{10}$ hydroxyl alkyl group; a polyether comprising repeat units of ($-CH_2CH_2O-$), ($-CH_2CH(CH_3)O-$), ($-CH(CH_3)CH(CH_3)O-$), ($-CH_2CH(CH_2CH_3)O-$), or a mixture thereof, wherein the total number of repeat units is in the range of 2 to 100; or any combination thereof.

11. The composition of any of claims 1, 3 and 6-8, wherein the organic group is a benzyl group, wherein the benzyl group may be substituted with one or more of: a halogen; a cyano group; an ester group; an amide group; an ether group; a $C_1$ to $C_6$ alkyl group; an aryl group; a $C_2$ to $C_6$ alkene group; a $C_2$ to $C_6$ alkyne group; or any combination thereof.

12. The composition of any preceding embodiment, wherein the poly alpha-1,6-glucan derivative has a biodegradability as determined by the OECD 301B Ready Biodegradability $CO_2$ Evolution Test Method of at least 10% on the $90^{th}$ day test duration.

13. The composition of any preceding embodiment, wherein the composition is in the form of a liquid, a gel, a powder, a hydrocolloid, an aqueous solution, a granule, a tablet, a capsule, a single compartment sachet, a pad, a multi-compartment sachet, a single compartment pouch, or a multi-compartment pouch.

14. The composition of any preceding embodiment, wherein the composition further comprising an ingredient selected from: surfactant, an enzyme, a detergent builder, a complexing agent, a polymer, a soil release polymer, a surfactancy-boosting polymer, a bleaching agent, a bleach activator, a bleaching catalyst, a fabric conditioner, a clay, a foam booster, a suds suppressor, an anti-corrosion agent, a soil-suspending agent, an anti-soil re-deposition agent, a dye, a bactericide, a tarnish inhibitor, an optical brightener, a perfume, a saturated or unsaturated fatty acid, a dye transfer-inhibiting agent, a chelating agent, a hueing dye, a calcium cation, a magnesium cation, a visual signaling ingredient, an anti-foam, a structurant, a thickener, an anti-caking agent, a starch, sand, a gelling agent, or any combination thereof.

15. The composition of any preceding embodiment, wherein the composition comprises an enzyme selected from: a cellulase, a protease, an amylase, a lipase, or any combination thereof.

Typically, hydrophilic organic groups include carboxylic acids, carboxylic acid salts, sulfonic acid derivatives, sulfonic acid derivative salts, sulfuric acid derivatives, sulfuric acid derivative salts, thiosulfate, thiosulfate salts, phosphoric acid derivatives, phosphoric acid derivative salts, alkyl amines, alkyl substituted ammonium salts, quaternized pyridine salts, quaternized imidazole salts, and any combination thereof.

By hydrophobic organic group, it is typically meant not a hydrophilic organic group.

Typically, a hydrophobic organic group is selected from a $C_1$ to $C_{18}$ alkyl, a $C_2$ to $C_{18}$ alkene, a $C_2$ to $C_{18}$ alkyne, a polyether comprising repeat units of ($-CH_2CH_2O-$), ($-CH_2CH(CH_3)O-$), ($-CH(CH_3)CH(CH_3)O-$), ($-CH_2CH(CH_2CH_3)O-$), or a mixture thereof, wherein the total number of repeat units is in the range of from 2 to 100, a $C_6$ to $C_{20}$ aryl, a benzyl, a $C_1$-$C_{18}$ alkyl sulfonyl, a $C_6$-$C_{20}$ aryl sulfonyl, a p-toluenesulfonyl group, or any combination thereof.

Typically, a hydrophobic organic group may be selected from a $C_1$ to $C_{18}$ alkyl, a benzyl, a p-toluenesulfonyl group, or any combination thereof. The organic group may be selected from a benzyl group, and the benzyl group may be further substituted with one or more of a halogen, a cyano, an ester, an amide, an ether group, a $C_1$ to $C_6$ alkyl group, an aryl group, a $C_2$ to $C_6$ alkene group, a $C_2$ to $C_6$ alkyne group, or any combination thereof.

Typically, a hydrophobic organic group may be selected from a $C_1$ to $C_{18}$ alkyl group, a hydroxy alkyl group, a $C_2$ to $C_{18}$ alkenyl group, a $C_2$ to $C_{18}$ alkynyl group, a benzyl group, a $C_6$ to $C_{20}$ aryl group, a polyether comprising repeat units of ($-CH_2CH_2O-$), ($-CH_2CH(CH_3)O-$), ($-CH(CH_3)CH(CH_3)O-$), ($-CH_2CH(CH_2CH_3)O-$), or a mixture thereof, wherein the total number of repeat units is in the range of 2 to 100, or any combination thereof.

Typically, a hydrophobic organic group may be selected from a $C_1$-$C_{10}$ alkyl group, a $C_1$-$C_{10}$ hydroxyl alkyl group, a polyether comprising repeat units of ($-CH_2CH_2O-$), ($-CH_2CH(CH_3)O-$), ($-CH(CH_3)CH(CH_3)O-$), ($-CH_2CH(CH_2CH_3)O-$), or a mixture thereof, wherein the total number of repeat units is in the range of 2 to 100, or any combination thereof.

Typically, a hydrophobic organic group may be selected from $C_6$-$C_{20}$ aryl groups, optionally substituted with alkyl groups, the aryl group may preferably be a tolyl group.

Laundry care and dish care compositions are typically suitable for: (a) the care of finished textiles, cleaning of finished textiles, sanitization of finished textiles, disinfection of finished textiles, detergents, stain removers, softeners, fabric enhancers, stain removal or finished textiles treatments, pre and post wash treatments, washing machine cleaning and maintenance, with finished textiles intended to include garments and items made of cloth; (b) the care of dishes, glasses, crockery, cooking pots, pans, utensils, cutlery and the like in automatic, in-machine washing, including detergents, preparatory post treatment and machine cleaning and maintenance products for both the dishwasher, the utilized water and its contents; or (c) manual hand dish washing detergents.

The following example formulations are suitable for the present invention:

The following are illustrative examples of cleaning compositions according to the present disclosure and are not intended to be limiting.

Examples 1-7: Heavy Duty Liquid laundry detergent compositions.

| Ingredients | 1 | 2 | 3 | 4 | 5 | 6 | 7 |
|---|---|---|---|---|---|---|---|
| | | | | % weight | | | |
| $AE_{1.8}S$ | 6.77 | 5.16 | 1.36 | 1.30 | — | — | — |
| $AE_3S$ | — | — | — | — | 0.45 | — | — |
| LAS | 0.86 | 2.06 | 2.72 | 0.68 | 0.95 | 1.56 | 3.55 |
| HSAS | 1.85 | 2.63 | 1.02 | — | — | — | — |
| AE9 | 6.32 | 9.85 | 10.20 | 7.92 | | | |
| AE8 | | | | | | | 35.45 |
| AE7 | | | | | 8.40 | 12.44 | |
| $C_{12-14}$ dimethyl Amine Oxide | 0.30 | 0.73 | 0.23 | 0.37 | — | — | — |
| $C_{12-18}$ Fatty Acid | 0.80 | 1.90 | 0.60 | 0.99 | 1.20 | — | 15.00 |
| Citric Acid | 2.50 | 3.96 | 1.88 | 1.98 | 0.90 | 2.50 | 0.60 |
| Optical Brightener 1 | 1.00 | 0.80 | 0.10 | 0.30 | 0.05 | 0.50 | 0.001 |
| Optical Brightener 3 | 0.001 | 0.05 | 0.01 | 0.20 | 0.50 | — | 1.00 |
| Sodium formate | 1.60 | 0.09 | 1.20 | 0.04 | 1.60 | 1.20 | 0.20 |
| DTI | 0.32 | 0.05 | — | 0.60 | — | 0.60 | 0.01 |
| Sodium hydroxide | 2.30 | 3.80 | 1.70 | 1.90 | 1.70 | 2.50 | 2.30 |
| Monoethanolamine | 1.40 | 1.49 | 1.00 | 0.70 | — | — | — |
| Diethylene glycol | 5.50 | — | 4.10 | — | — | — | — |
| Chelant 1 | 0.15 | 0.15 | 0.11 | 0.07 | 0.50 | 0.11 | 0.80 |
| 4-formyl-phenylboronic acid | — | — | — | — | 0.05 | 0.02 | 0.01 |
| Sodium tetraborate | 1.43 | 1.50 | 1.10 | 0.75 | — | 1.07 | — |
| Ethanol | 1.54 | 1.77 | 1.15 | 0.89 | — | 3.00 | 7.00 |
| Polymer 1 | 0.10 | — | — | — | — | — | 2.00 |
| Polymer 2 | 0.30 | 0.33 | 0.23 | 0.17 | — | — | — |
| Polymer 3 | — | — | — | — | — | — | 0.80 |
| Polymer 4 | 0.80 | 0.81 | 0.60 | 0.40 | 1.00 | 1.00 | — |
| Polymer 5 (polyglucans) | 0.50 | 1.00 | 2.00 | 2.50 | 3.00 | 2.50 | 1.50 |
| 1,2-Propanediol | — | 6.60 | — | 3.30 | 0.50 | 2.00 | 8.00 |
| Structurant | 0.10 | — | — | — | — | — | 0.10 |
| Perfume | 1.60 | 1.10 | 1.00 | 0.80 | 0.90 | 1.50 | 1.60 |
| Perfume encapsulate | 0.10 | 0.05 | 0.01 | 0.02 | 0.10 | 0.05 | 0.10 |
| Protease | 0.80 | 0.60 | 0.70 | 0.90 | 0.70 | 0.60 | 1.50 |
| Mannanase | 0.07 | 0.05 | 0.045 | 0.06 | 0.04 | 0.045 | 0.10 |
| Amylase 1 | 0.30 | — | 0.30 | 0.10 | — | 0.40 | 0.10 |
| Amylase 2 | — | 0.20 | 0.10 | 0.15 | 0.07 | — | 0.10 |
| Xyloglucanase | 0.20 | 0.10 | — | — | 0.05 | 0.05 | 0.20 |
| Lipase | 0.40 | 0.20 | 0.30 | 0.10 | 0.20 | — | — |
| Polishing enzyme | — | 0.04 | — | — | — | 0.004 | — |
| Nuclease | 0.05 | — | — | — | — | — | 0.003 |
| Dispersin B | — | — | — | 0.05 | 0.03 | 0.001 | 0.001 |
| Liquitint ® V200 | 0.01 | — | — | — | — | — | 0.005 |
| Leuco colorant | 0.05 | 0.035 | 0.01 | 0.02 | 0.004 | 0.002 | 0.004 |
| Dye control agent | — | 0.3 | — | 0.03 | — | 0.3 | 0.3 |
| Water, dyes & minors | | | | Balance | | | |
| pH | | | | 8.2 | | | |

Based on total cleaning and/or treatment composition weight. Enzyme levels are reported as raw material.

| | |
|---|---|
| AE1.8S | is $C_{12-15}$ alkyl ethoxy (1.8) sulfate |
| AE3S | is $C_{12-15}$ alkyl ethoxy (3) sulfate |
| AE7 | is $C_{12-13}$ alcohol ethoxylate, with an average degree of ethoxylation of 7 |
| AE8 | is $C_{12-13}$ alcohol ethoxylate, with an average degree of ethoxylation of 8 |
| AE9 | is $C_{12-13}$ alcohol ethoxylate, with an average degree of ethoxylation of 9 |
| Amylase 1 | is Stainzyme®, 15 mg active/g, supplied by Novozymes |
| Amylase 2 | is Natalase®, 29 mg active/g, supplied by Novozymes |
| Xyloglucanase | is Whitezyme®, 20mg active/g, supplied by Novozymes |
| Chelant 1 | is diethylene triamine pentaacetic acid |
| Chelant 2 | is 1-hydroxyethane 1,1-diphosphonic acid |
| Dispersin B | is a glycoside hydrolase, reported as 1000 mg active/g |
| DTI | is either poly(4-vinylpyridine-1-oxide) (such as Chromabond S-403E®), or poly(1-vinylpyrrolidone-co-1-vinylimidazole) (such as Sokalan HP56® ). |
| Dye control agent | Dye control agent in accordance with the invention, for example Suparex® O.IN (M1), Nylofixan® P (M2), Nylofixan® PM (M3), or Nylofixan® HF (M4) |
| HSAS | is mid-branched alkyl sulfate as disclosed in U.S. Pat. No. 6,020,303 and U.S. Pat. No. 6,060,443 |
| LAS | is linear alkylbenzenesulfonate having an average aliphatic carbon chain length $C_9$-$C_{15}$ (HLAS is acid form). |

-continued

| | |
|---|---|
| Leuco colorant | Any suitable leuco colorant or mixtures thereof according to the instant invention. |
| Lipase | is Lipex®, 18 mg active/g, supplied by Novozymes |
| Liquitint® V200 | is a thiophene azo dye provided by Milliken |
| Mannanase | is Mannaway®, 25 mg active/g, supplied by Novozymes |
| Nuclease | is a Phosphodiesterase SEQ ID NO 1, reported as 1000 mg active/g |
| Optical Brightener 1 | is disodium 4,4'-bis{[4-anilino-6-morpholino-s-triazin-2-y]]-amino}-2,2'-stilbenedisulfonate |
| Optical Brightener 3 | is Optiblanc SPL10® from 3V Sigma |
| Perfume encapsulate | is a core-shell melamine formaldehyde perfume microcapsules. |
| Polishing enzyme | is Para-nitrobenzyl esterase, reported as 1000 mg active/g |
| Polymer 1 | is bis($(C_2H_5O)(C_2H_4O)n)(CH_3)$—$N^+$—$C_xH_{2x}$—$N^+$—$(CH_3)$—bis($(C_2H_5O)(C_2H_4O)n$), wherein n = 20-30, x = 3 to 8 or sulphated or sulfonated variants thereof |
| Polymer 2 | is ethoxylated ($EO_{15}$) tetraethylene pentamine |
| Polymer 3 | is ethoxylated polyethylenimine |
| Polymer 4 | is ethoxylated hexamethylene diamine |
| Polymer 5 | is modified polyglucans of this invention |
| Protease | is Purafect Prime®, 40.6 mg active/g, supplied by DuPont |
| Structurant | is Hydrogenated Castor Oil |

The following is a suitable water-soluble unit dose formulation. The composition can be part of a single chamber water soluble unit dose article or can be split over multiple compartments resulting in below "averaged across compartments" full article composition.

| Ingredients | Composition 1 (wt %) |
|---|---|
| Fatty alcohol ethoxylate non-ionic surfactant, $C_{12-14}$ average degree of ethoxylation of 7 | 3.8 |
| Lutensol XL100 | 0.5 |
| Linear $C_{11-14}$ alkylbenzene sulphonate | 24.6 |
| AE3S Ethoxylated alkyl sulphate with an average degree of ethoxylation of 3 | 12.5 |
| Citric acid | 0.7 |
| Palm Kernel Fatty acid | 5.3 |
| Nuclease enzyme (wt % active protein) | 0.01 |
| Protease enzyme (wt % active protein) | 0.07 |
| Amylase enzyme (wt % active protein) | 0.005 |
| Xyloglucanese enzyme (wt % active protein) | 0.005 |
| Mannanase enzyme (wt % active protein) | 0.003 |
| Ethoxylated polyethyleneimine | 1.6 |
| Amphiphilic graft copolymer | 2.6 |
| Zwitterionic polyamine | 1.8 |
| Polyglucan of the present invention | 5.0 |

-continued

| Ingredients | Composition 1 (wt %) |
|---|---|
| Anionic polyester terephthalate | 0.6 |
| HEDP | 2.2 |
| Brightener 49 | 0.4 |
| Silicone anti-foam | 0.3 |
| Hueing dye | 0.05 |
| 1,2 PropaneDiol | 12.3 |
| Glycerine | 4.7 |
| DPG (DiPropyleneGlycol) | 1.7 |
| TPG (TriPropyleneGlycol) | 0.1 |
| Sorbitol | 0.1 |
| Monoethanolamine | 10.2 |
| K2SO3 | 0.4 |
| MgCl2 | 0.3 |
| water | 10.8 |
| Hydrogenated castor oil | 0.1 |
| Perfume | 2.1 |
| Aesthetic dye & Minors | Balance to 100 |
| pH (10% product concentration in demineralized water at 20° C.) | 7.4 |

Solid free-flowing particulate laundry detergent composition examples:

| Ingredient | Amount (in wt %) |
|---|---|
| Anionic detersive surfactant (such as alkyl benzene sulphonate, alkyl ethoxylated sulphate and mixtures thereof) | from 8 wt % to 15 wt % |
| Non-ionic detersive surfactant (such as alkyl ethoxylated alcohol) | from 0.1 wt % to 4 wt % |
| Cationic detersive surfactant (such as quaternary ammonium compounds) | from 0 wt % to 4 wt % |
| Other detersive surfactant (such as zwiterionic detersive surfactants, amphoteric surfactants and mixtures thereof) | from 0 wt % to 4 wt % |
| Carboxylate polymer (such as co-polymers of maleic acid and acrylic acid and/or carboxylate polymers comprising ether moieties and sulfonate moieties) | from 0.1 wt % to 4 wt % |
| Polyethylene glycol polymer (such as a polyethylene glycol polymer comprising polyvinyl acetate side chains) | from 0 wt % to 4 wt % |
| Polyester soil release polymer (such as Repel-o-tex and/or Texcare polymers) | from 0 wt % to 2 wt % |
| Cellulosic polymer (such as carboxymethyl cellulose, methyl cellulose and combinations thereof) | from 0.5 wt % to 2 wt % |
| Polyglucan of the present invention | From 0. l wt % to 8 wt % |
| Other polymer (such as care polymers) | from 0 wt % to 4 wt % |
| Zeolite builder and phosphate builder (such as zeolite 4A and/or sodium tripolyphosphate) | from 0 wt % to 4 wt % |

-continued

| Ingredient | Amount (in wt %) |
|---|---|
| Other co-builder (such as sodium citrate and/or citric acid) | from 0 wt % to 3 wt % |
| Carbonate salt (such as sodium carbonate and/or sodium bicarbonate) | from 0 wt % to 20 wt % |
| Silicate salt (such as sodium silicate) | from 0 wt % to 10 wt % |
| Filler (such as sodium sulphate and/or bio-fillers) | from 10 wt % to 70 wt % |
| Source of hydrogen peroxide (such as sodium percarbonate) | from 0 wt % to 20 wt % |
| Bleach activator (such as tetraacetylethylene diamine (TAED) and/or nonanoyloxybenzenesulphonate (NOBS)) | from 0 wt % to 8 wt % |
| Bleach catalyst (such as oxaziridinium-based bleach catalyst and/or transition metal bleach catalyst) | from 0 wt % to 0.1 wt % |
| Other bleach (such as reducing bleach and/or pre-formed peracid) | from 0 wt % to 10 wt % |
| Photobleach (such as zinc and/or aluminium sulphonated phthalocyanine) | from 0 wt % to 0.1 wt % |
| Chelant (such as ethylenediamine-N'N'-disuccinic acid (EDDS) and/or hydroxyethane diphosphonic acid (HEDP)) | from 0.2 wt % to 1 wt % |
| Hueing agent (such as direct violet 9, 66, 99, acid red 50, solvent violet 13 and any combination thereof) | from 0 wt % to 1 wt % |
| Brightener (CI. fluorescent brightener 260 or C.I. fluorescent brightener 351) | from 0.1 wt % to 0.4 wt % |
| Protease (such as Savinase, Savinase Ultra, Purafect, FN3, FN4 and any combination thereof) | from 0.1 wt % to 0.4 wt % |
| Amylase (such as Termamyl, Termamyl ultra, Natalase, Optisize, Stainzyme, Stainzyme Plus and any combination thereof) | from 0 wt % to 0.2 wt % |
| Cellulase (such as Carezyme and/or Celluclean) | from 0 wt % to 0.2 wt % |
| Lipase (such as Lipex, Lipolex, Lipoclean and any combination thereof) | from 0 wt % to 1 wt % |
| Other enzyme (such as xyloglucanase, cutinase, pectate lyase, mannanase, bleaching enzyme) | from 0 wt % to 2 wt % |
| Fabric softener (such as montmorillonite clay and/or polydimethylsiloxane (PDMS)) | from 0 wt % to 15 wt % |
| Flocculant (such as polyethylene oxide) | from 0 wt % to 1 wt % |
| Suds suppressor (such as silicone and/or fatty acid) | from 0 wt % to 4 wt % |
| Perfume (such as perfume microcapsule, spray-on perfume, starch encapsulated perfume accords, perfume loaded zeolite, and any combination thereof) | from 0.1 wt % to 1 wt % |
| Aesthetics (such as coloured soap rings and/or coloured speckles/noodles) | from 0 wt % to 1 wt % |
| Miscellaneous | balance to 100 wt % |

EXAMPLES

Unless otherwise stated, all ingredients are available from Sigma-Aldrich, St. Louis, Missouri and were used as received.

As used herein, "Comp. Ex." Means Comparative Example; "Ex." means Example; "std dev" means standard deviation; "g" means gram(s); "mL" means milliliter(s); "uL" means microliter(s); "wt" means weight; "L" means liter(s); "min" means minute(s); "kDa" means kilodaltons; "PES" means polyethersulfone.

Method for Determining Anomeric Linkages by NMR Spectroscopy

Glycosidic linkages in water soluble oligosaccharides and polysaccharide products synthesized by a glucosyltransferase GTF8117 and alpha-1,2 branching enzyme were determined by $^1H$ NMR (Nuclear Magnetic Resonance Spectroscopy). Dry oligosaccharide/polysaccharide polymer (6 mg to 8 mg) was dissolved in a solution of 0.7 mL of 1 mM DSS (4,4-dimethyl-4-silapentane-1-sulfonic acid; NMR reference standard) in $D_2O$. The sample was stirred at ambient temperature overnight. 525 uL of the clear homogeneous solution was transferred to a 5 mm NMR tube. 2D $^1H$, $^{13}C$ homo/hetero-nuclear suite of NMR experiments were used to identify AGU (anhydroglucose unit) linkages. The data were collected at 20° C. and processed on a Bruker Avance III NMR spectrometer, operating at either 500 MHz or 600 MHz. The systems are equipped with a proton optimized, helium cooled cryoprobe. The 1D $^1H$ NMR spectrum was used to quantify glycosidic linkage distribution and finds the polysaccharide backbone as primarily alpha-1,6. The results reflect the ratio of the integrated intensity of a NMR resonance representing an individual linkage type divided by the integrated intensity of the sum of all peaks which represent glucose linkages, multiplied by 100.

Water Solubility Test Method

The following method was used to determine if a poly alpha-1,6-glucan derivative was water soluble. The derivative was suspended at a determined weight in deionized water and shaken or stirred overnight at room temperature. The polymer is soluble if no solid is detected.

Biodegradation Test Method

The biodegradability of the polysaccharide derivative was determined following the OECD 301B Ready Biodegradability $CO_2$ Evolution Test Guideline. In this study, the test substance is the sole carbon and energy source and under aerobic conditions microorganisms metabolize the test substance producing $CO_2$ or incorporating the carbon into biomass. The amount of $CO_2$ produced by the test substance (corrected for the $CO_2$ evolved by the blank inoculum) is expressed as a percentage of the theoretical amount of $CO_2$ ($ThCO_2$) that could have been produced if the organic carbon in the test substance was completely converted to $CO_2$.

Method for Evaluating Whiteness Performance of Polymers

Whiteness maintenance, also referred to as whiteness preservation, is the ability of a detergent to keep white items from whiteness loss when they are washed in the presence of soils. White garments can become dirty/dingy looking over time when soils are removed from dirty clothes and suspended in the wash water, then these soils can re-deposit onto clothing, making the clothing less white each time they are washed. The whiteness benefit of poly alpha-1,6-glucan derivatives is evaluated using automatic Miniwasher with 5 pots. SBL2004 test soil strips supplied by WFK Testgewebe GmbH are used to simulate consumer soil levels (mix of body soil, food, dirt, grass etc.). On average, every 1 SBL2004 strip is loaded with 8 g soil. White Fabric swatches of Table 2 below purchased from WFK Testgewebe GmbH are used as whiteness tracers. Before wash test, L, a, b values of all whiteness tracers are measured using a Konica Minolta CM-3610D spectrophotometer.

TABLE 2

White Fabric Swatches

| Code | % Fiber Content | Fiber Construction | Fabric Density (g/m) | Whiteness Index (WI) A* | Whiteness Index (WI) D65** | Size |
|---|---|---|---|---|---|---|
| Cotton Terry | 100 | Woven | ~540 | ~93 | ~163 | 8" × 8" (20 × 20 cm) |
| Cotton Knit | 100 | Weft Knit | ~220 | ~96 | ~165 | 8" × 8" (20 × 20 cm) |
| Polyester/Cotton | 65/35 | Plain Woven | ~125 | ~98 | ~156 | 8" × 8" (20 × 20 cm) |
| Polyester | 100 | Weft Knit | ~200 | ~95 | ~156 | 8" × 8" (20 × 20 cm) |
| Cotton/Spandex | 98/2 | Woven Twill | ~180 | ~86 | ~158 | 8" × 8" (20 × 20 cm) |

*WI(A)—illuminant A (indoor lighting)
**WI(D65)—illuminant D65 (outdoor lighting)

Three cycles of wash are needed to complete the test:

Cycle 1: desired amount of detergent is fully dissolved by mixing with 7.57 L water (at defined hardness) in each Miniwasher tube. 3.5 SBL2004 strips (~28 g of soil) and 3 whiteness tracers (internal replicate) of each fabric type are washed and rinsed in the Miniwasher under defined conditions, then dried.

Cycle 2: The above whiteness tracers are washed again with new set of SBL2004 sheet, and dried. All other conditions remain same as cycle 1.

Cycle 3: The above whiteness tracers are washed again with new set of SBL2004 sheet, and dried. All other conditions remain same as cycle 1.

After Cycle 3, all whiteness tracers are dried and then measured again using Konica Minolta CM-3610D spectrophotometer. The changes in Whiteness Index (ΔWI(CIE)) are calculated based on L, a, b measure before and after wash:

$$\Delta WI(CIE) = WI(CIE)(\text{after wash}) - WI(CIE)(\text{before wash}).$$

Miniwasher have 5 pots, 5 products can be tested in one test. In a typical polymer whiteness performance test, one reference product contains comparative polymer or no polymer is tested together with 4 products containing inventive polyglucan derivatives as disclosed herein, and "ΔWI versus reference" is reported.

$$\Delta WI(CIE) \text{ versus reference} = \Delta WI(CIE)(\text{product}) - \Delta WI(CIE)(\text{reference})$$

Representative Preparation of Poly Alpha-1,3-Glucan

Poly alpha-1,3-glucan can be prepared using a gtfJ enzyme preparation as described in U.S. Pat. No. 7,000,000; U.S. Patent Appl. Publ. No. 2013/0244288, now U.S. Pat. No. 9,080,195; and U.S. Patent Appl. Publ. No. 2013/0244287, now U.S. Pat. No. 8,642,757 (all of which are incorporated herein by reference in their entirety).

Poly alpha-1,3-glucan polymer can be synthesized following the procedures disclosed in U.S. Appl. Publ. No. 2014/0179913, now U.S. Pat. No. 9,139,718 (see Example 12 therein, for example), both of which are incorporated herein by reference in their entirety.

Preparation of Poly Alpha-1,6-Glucan Samples

Methods to prepare poly alpha-1,6-glucan containing various amounts of alpha-1,2 branching are disclosed in published patent application WO2017/091533, which is incorporated herein by reference. Reaction parameters such as sucrose concentration, temperature, and pH can be adjusted to provide poly alpha-1,6-glucan having various levels of alpha-1,2-branching and molecular weight. A representative procedure for the preparation of alpha-1,2-branched poly alpha-1,6-glucan is provided below (containing 19% alpha-1,2-branching and 81% alpha-1,6 linkages). The 1D $^1$H NMR spectrum was used to quantify glycosidic linkage distribution. Additional samples of poly alpha-1,6-glucan with alpha-1,2-branching were prepared similarly. For example, one sample contained 32% alpha-1,2-branching and 68% alpha-1,6 linkages, and another contained 10% alpha-1,2-branching and 90% alpha-1,6 linkages.

Preparation of Poly Alpha-1,6-Glucan With 19% Alpha-1,2 Branching

Soluble alpha-1,2-branched poly alpha-1,6-glucan was prepared using stepwise combination of glucosyltransferase GTF8117 and alpha-1,2 branching enzyme GTFJ18T1, according to the following procedure.

A reaction mixture (2 L) comprised of sucrose (450 g/L), GTF8117 (9.4 U/mL), and 50 mM sodium acetate was adjusted to pH 5.5 and stirred at 47° C. Aliquots (0.2-1 mL) were withdrawn at predetermined times and quenched by heating at 90° C. for 15 min. The resulting heat-treated aliquots were passed through 0.45-μm filter. The flow-through was analyzed by HPLC to determine the concentration of sucrose, glucose, fructose, leucrose, oligosaccharides and polysaccharides. After 23.5 h, the reaction mixture was heated to 90° C. for 30 minutes. An aliquot of the heat-treated reaction mixture was passed through 0.45-μm filter and the flow-through was analyzed for soluble mono/disaccharides, oligosaccharides, and polysaccharides. A major product was linear dextran with a DPw of 93.

A second reaction mixture was prepared by adding 238.2 g of sucrose and 210 mL of alpha-1,2-branching enzyme GTFJ18T1 (5.0 U/mL) to the leftover heat-treated reaction mixture that was obtained from the GTF8117 reaction described immediately above. The mixture was stirred at 30° C. with a volume of ~2.2 L. Aliquots (0.2-1 mL) were withdrawn at predetermined times and quenched by heating at 90° C. for 15 min. The resulting heat-treated aliquots were passed through 0.45-μm filter. The flow-through was analyzed by HPLC to determine the concentration of sucrose, glucose, fructose, leucrose, oligosaccharides and polysaccharides. After 95 h, the reaction mixture was heated to 90° C. for 30 minutes. An aliquot of the heat-treated reaction mixture was passed through 0.45-μm filter and the flow-through was analyzed for soluble mono/disaccharides, oligosaccharides, and polysaccharides. Leftover heat-treated mixture was centrifuged using 1 L centrifugation bottles. The supernatant was collected and cleaned more than 200-fold using ultrafiltration system with 1 or 5 KDa MWCO cassettes and deionized water. The cleaned oligo/polysaccharide product solution was dried. Dry sample was then analyzed by $^1$H NMR spectroscopy to determine the anomeric linkages of the oligosaccharides and polysaccharides.

Comparative Polymer Example 1

Modification of Poly Alpha-1,3-Glucan (DPw 800) with Benzyl Chloride at Low DoS (DoS=0.17)

To a 4-neck 2 liter flask was added with stirring 980 mL of water and, portion-wise, poly alpha-1,3-glucan (270 g of 40 wt % solid). Sodium hydroxide (55 g of 50 wt % aqueous solution) was added dropwise over a 10-minute period while the reaction mixture was stirred at 20-25° C., then at room temperature for 2 hours. The reaction mixture was heated to 75° C. and benzyl chloride (77 g) was added. The reaction mixture was heated to 85° C. and kept at 85° C. for 3.5 hours. The reaction mixture was cooled and filtered. The wet cake was washed with water (3×700 mL), ethanol (50 wt %, 800 mL), methanol (80 wt %, 800 mL), acetone (800 mL), and hexanes (2×500 mL). The resulting wet cake was dried on frit with vacuum and $N_2$ purge for 3 hours to afford a white solid. The solid was dried in vacuum oven at 80° C. overnight with nitrogen sweep to give a white solid, 96 g. The degree of benzyl substitution was determined by $^1$H NMR analysis to be 0.17. This material is not water soluble at 0.1 wt %.

Inventive Polymer Example 1

Modification of Poly Alpha-1,6-Glucan With Phenyl Isocyanate (DoS=0.24)

Poly alpha-1,6-glucan (21 kDa, 31% alpha-1,2-branching and 69% alpha-1,6 linkages, 20.0 g) was heated with 200 mL dimethyl formamide at 90° C. for 1 hour under nitrogen. The mixture was cooled to 55° C. To this was added phenyl isocyanate (14 g). The mixture was heated to 70° C. for 3 hours. After cooling to room temperature, the mixture was poured into 300 mL isopropanol to precipitate out the product. The product was collected by filtration, washed with isopropanol (3×100 mL) and acetone (100 mL). The degree of substitution was determined by $^1$H NMR analysis to be 0.24. This material is water soluble at greater than 0.1 wt %.

Inventive Polymer Example 2

Modification of Poly Alpha-1,6-Glucan With Phenyl Chloroformate

Poly alpha-1,6-glucan (21 kDa, 31% alpha-1,2-branching and 69% alpha-1,6 linkages, 10.0 g) was heated with 200 mL dimethyl acetamide at 90° C. for 1.5 hour under nitrogen. The mixture was cooled to room temperature. To this was added pyridine (4.2 g). The mixture was cooled in a salt/ice bath. To the cooled mixture was added phenyl chloroformate (9 g) dropwise. The mixture was stirred at room temperature for 2 hours, then warmed to room temperature and stirred for 72 hours. Ice (10 g) was added to the mixture and the resulting mixture was stirred for 30 min at room temperature. The content was poured into 300 mL isopropanol to yield fine white precipitate. The solid was collected by filtration, washed with isopropanol (3×100 mL) and acetone (100 mL). The degree of substitution with a carbonate group was determined by $^1$H NMR analysis to be 0.07.

Inventive Polymer Example 3 (DoS=0.43)

Modification of Poly Alpha-1,6-Glucan With Phenyl Isocyanate

Poly alpha-1,6-glucan powder (56 kDa, 15-25% alpha-1,2-branching and 75-85% alpha-1,6 linkages, 20.14 g) was suspended in DMAc (100 mL) and stirred overnight at room temperature. DMAc (37 g) was distilled off at 85° C. and 20 torr, followed by the dropwise addition of phenyl isocyanate (19.21 g) to the material remaining in the pot. The reaction mixture was stirred at 85° C. for 3 h. The product was precipitated and purified using isopropanol yielding 34.99 g of a white powder after vacuum drying.

Inventive Polymer Example 4 (DoS=0.59)

Modification of Poly Alpha-1,6-Glucan With Phenyl Isocyanate

Poly alpha-1,6-glucan powder (56 kDa, 15-25% alpha-1,2-branching and 75-85% alpha-1,6 linkages, 20.07 g) was suspended in DMAc (100 mL) and stirred overnight at room temperature. DMAc (34.09 g) was distilled off at 87° C. and 22 torr, followed by the dropwise addition of phenyl isocyanate (26.14 g) to the material remaining in the pot. The reaction mixture was stirred at 85° C. for 4 h. The product was precipitated and purified using isopropanol yielding 29.41 g of a powder after vacuum drying.

Inventive Polymer Example 5 (DoS=0.24)

Modification of Poly Alpha-1,6-Glucan With Phenyl Isocyanate

Poly alpha-1,6-glucan powder (40 kDa, 15-25% alpha-1,2-branching and 75-85% alpha-1,6 linkages, 20.20 g) was suspended in DMAc (100 mL) and stirred overnight at room temperature. DMAc (24.52 g) was distilled off at 88° C. and 30 torr, followed by the dropwise addition of phenyl isocyanate (10.77 g) to the material remaining in the pot. The reaction mixture was stirred at 85° C. for 2 h. The product was precipitated and purified using isopropanol yielding 31.92 g of a powder after vacuum drying.

Inventive Polymer Example 6 (DoS=0.20)

Modification of Poly Alpha-1,6-Glucan With Diethylcarbamoyl Chloride

Poly alpha-1,6-glucan powder (56 kDa, 15-25% alpha-1,2-branching and 75-85% alpha-1,6 linkages, 20.22 g) was suspended in DMAc (100 mL) and stirred overnight at room temperature. DMAc (33.62 g) was distilled off at 84° C. and 20 torr followed, by the dropwise addition of diethylcarbamoyl chloride (10.06 g) to the material remaining in the pot. The reaction mixture was stirred at 85° C. for 4.5 h. The product was precipitated and purified using isopropanol yielding 21.20 g of a light tan powder after vacuum drying.

Inventive Polymer Example 7 (DoS=0.40)

Modification of Poly Alpha-1,6-Glucan With Diethylcarbamoyl Chloride

Poly alpha-1,6-glucan powder (56 kDa, 15-25% alpha-1,2-branching and 75-85% alpha-1,6 linkages, 20.20 g) was suspended in DMAc (100 mL) and stirred overnight at room temperature. DMAc (40.01 g) was distilled off at 88° C. and 20 torr, followed by the dropwise addition of diethylcarbamoyl chloride (20.16 g) to the material remaining in the pot. The reaction mixture was stirred at 85° C. for 7 h followed by stirring with cooling to room temperature for 15 hours. The product was precipitated and purified using isopropanol yielding 12.19 g of a light tan powder after vacuum drying.

Inventive Polymer Example 8 (DoS=0.21)

Modification of Poly Alpha-1,6-Glucan With p-Toluenesulfonyl Isocyanate

Poly alpha-1,6-glucan powder (56 kDa, 15-25% alpha-1,2-branching and 75-85% alpha-1,6 linkages, 20.05 g) was suspended in DMAc (100 mL) and stirred overnight at room temperature. DMAc (45.56 g) was distilled off at 88° C. and 22 torr, followed by the dropwise addition of p-toluenesulfonyl isocyanate (15.47 g) to the material remaining in the pot. The reaction mixture was stirred at 88° C. for 23 h. The product was precipitated and purified using isopropanol yielding 26.51 g of a powder after vacuum drying.

Inventive Polymer Example 9 (DoS=0.39)

Modification of Poly Alpha-1,6-Glucan With Phenyl Isocyanate in Water

Poly alpha-1,6-glucan powder (56 kDa, 15-25% alpha-1,2-branching and 75-85% alpha-1,6 linkages, 20.15 g) was dissolved in water (80.10 g) followed by the addition of NaOH (0.25 N, ~2 mL) to increase the pH to 11. Phenyl isocyanate (17.52 g) was added dropwise followed by stirring at room temperature for 3.5 hours. The product was precipitated and purified using isopropanol yielding 31.35 g of a white powder after vacuum drying.

Inventive Polymer Example 10 (DoS=0.39)

Modification of Poly Alpha-1,6-Glucan With Benzyl Isocyanate

Poly alpha-1,6-glucan powder (560 kDa, 15-25% alpha-1,2-branching and 75-85% alpha-1,6 linkages, 10.08 g) was dissolved in water (40.40 g) followed by the addition of NaOH (0.25 N, ~1 mL) to increase the pH to 11. Benzyl isocyanate (9.79 g) was added dropwise followed by stirring at room temperature for 4 hours. The product was precipitated and purified using isopropanol yielding 13.40 g of a powder after vacuum drying.

Biodegradation Test Results

The biodegradability of the poly alpha-1,6-glucan derivatives of Examples 1, and 8 was determined by following the OECD 301B Ready Biodegradability $CO_2$ Evolution Test Guideline. In this study, the test substance is the sole carbon and energy source and under aerobic conditions microorganisms metabolize the test substance producing $CO_2$ or incorporating the carbon into biomass. The amount of $CO_2$ produced by the test substance (corrected for the $CO_2$ evolved by the blank inoculum) is expressed as a percentage of the theoretical amount of $CO_2$ ($ThCO_2$) that could have been produced if the organic carbon in the test substance was completely converted to $CO_2$.

TABLE 2

Biodegradation Test Results

| Polysaccharide Derivative from | % $CO_2$ at 56 Days |
|---|---|
| Inventive polymer Example 1 | 88 |

The biodegradation test results (Table 2) show the materials have degraded by more than 40% at 56 days.

Polymer Performance in Liquid Base Detergent

Liquid detergents below are prepared by traditional means known to those of ordinary skill in the art by mixing the listed ingredients.

A: Comparative composition, with no poly alpha-1,6-glucan derivative;

B: Inventive composition, with inventive poly alpha-1,6-glucan derivative (Inventive polymer Example 1);

C: Inventive composition, with inventive poly alpha-1,6-glucan derivative (Inventive polymer Example 3);

| Detergent ingredient | Comparative | Inventive | |
|---|---|---|---|
| | A | B | C |
| AES (%) | 5.78 | 5.78 | 5.78 |
| NI C45 EO7 (%) | 6.57 | 6.57 | 6.57 |
| NI 24EO9 (%) | 0.10 | 0.10 | 0.10 |
| LAS (%) | 10.60 | 10.60 | 10.60 |
| DTPA (%) | 0.46 | 0.46 | 0.46 |
| Monoethanolamine (MEA) (%) | 2.52 | 2.52 | 2.52 |
| Sodium cumene sulfonate (%) | 1.21 | 1.21 | 1.21 |
| NaOH (%) | 0.43 | 0.43 | 0.43 |
| Sodium Tetraborate (%) | 1.21 | 1.21 | 1.21 |
| Citric acid (%) | 1.60 | 1.60 | 1.60 |
| Calcium formate (%) | 0.12 | 0.12 | 0.12 |
| Ethanol (%) | 1.61 | 1.61 | 1.61 |
| Brightener (%) | 0.16 | 0.16 | 0.16 |
| Dye (%) | 0.04 | 0.04 | 0.04 |
| Enzyme (Protease, Amylase, Mannanase) (%) | 0.08 | 0.08 | 0.08 |
| Perfume (%) | 0.57 | 0.57 | 0.57 |
| Antifoam | 0.20 | 0.20 | 0.20 |
| Structurant | 0.10 | 0.10 | 0.10 |
| Inventive polymer Example 1 | 0.00 | 2.65 | 0.00 |
| Inventive polymer Example 3 | 0.00 | 0.00 | 2.65 |
| Water | Balance | Balance | Balance |
| ΔWI (CIE) versus reference on PE (100% polyester knit) | reference | 2.57 | 4.66 |

The whiteness maintenance performance of formulation comparative composition A, inventive composition B and inventive composition C are evaluated according to the whiteness method. Inventive poly alpha-1,6-glucan derivatives can provide clear improvement on whiteness performance compare with comparative composition A.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A laundry care or dish care composition comprising a poly alpha-1,6-glucan derivative, wherein the poly alpha-1,6-glucan derivative comprises:

(i) a poly alpha-1,6-glucan backbone of glucose monomer units, wherein greater than or equal to 80% of the glucose monomer units are linked via alpha-1,6 glycosidic linkages, and wherein from about 10% or less of the glucose monomer units are linked via alpha-1,3 glycosidic linkages, alpha-1,2 glycosidic linkages, and/or alpha-1,4 glycosidic linkages; and (ii) at least one organic group linked to the poly alpha-1,6-glucan backbone through a

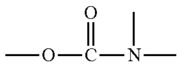

linkage moiety;

wherein, the poly alpha-1,6-glucan backbone has a weight average degree of polymerization of at least about 5;

wherein, the poly alpha-1,6-glucan derivative has a degree of substitution of

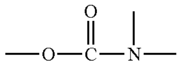

linkage moiety of from about 0.20 to about 1.00 and wherein the poly alpha-1,6-glucan derivative is free from hydrophilic substitution comprising carboxylic acid, carboxylic acid salt, sulfonic acid derivative, sulfonic acid derivative salt, sulfuric acid derivative, sulfuric acid derivative salt, thiosulfate, thiosulfate salt, phosphoric acid derivative, phosphoric acid derivative salt, alkyl amine, alkyl substituted ammonium salt, quaternized pyridine salt, and quaternized imidazole salt.

2. The laundry care or dish care composition according to claim 1, wherein the organic group linked to the poly alpha-1,6-glucan backbone is a hydrophobic organic group.

3. The laundry care or dish care composition according to claim 1, wherein the poly alpha-1,6-glucan derivative further comprises one or more additional organic groups linked to the poly alpha-1,6-glucan backbone through linkage moiety selected from one or more of ester (—OCO—), carbonate (—OCOO—), sulfonate ester (—$OSO_2$—), and ether (—O—).

4. The laundry care or dish care composition according to claim 1, wherein the alpha-1,6-glucan backbone of the poly alpha-1,6-glucan derivative has a weight average degree of polymerization of either from about 5 to about 95, or from about 125 to about 4000.

5. The laundry care or dish care composition according to claim 1, wherein, the poly alpha-1,6-glucan derivative has a degree of substitution of

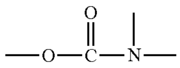

linkage moiety of from about 0.40 to about 0.90.

6. The laundry care or dish care composition according to claim 1, wherein the organic group is selected from: a $C_1$ to $C_{18}$ alkyl group; a hydroxy alkyl group; a $C_2$ to $C_{18}$ alkenyl group; a $C_2$ to $C_{18}$ alkynyl group; a benzyl group; a $C_6$ to $C_{20}$ aryl group; a polyether comprising repeat units of (—$CH_2CH_2O$—) and/or (—$CH_2CH(CH_3)O$—) wherein the total number of repeat units is in the range of about 2 to about 100; or any combination thereof.

7. The laundry care or dish care composition according to claim 1, wherein the organic group is selected from: a $C_1$-$C_{10}$ alkyl group; a $C_1$-$C_{10}$ hydroxyl alkyl group; a polyether comprising repeat units of (—$CH_2CH_2O$—), (—$CH_2CH(CH_3)O$—), (—$CH(CH_3)$ $CH(CH_3)O$—), (—$CH_2CH(CH_2CH_3)O$—), or a mixture thereof, wherein the total number of repeat units is in the range of about 2 to about 100; or any combination thereof.

8. The laundry care or dish care composition according to claim 1, wherein the organic group is a benzyl group, wherein the benzyl group may be substituted with one or more of: a halogen; a cyano group; an ester group; an amide group; an ether group; a $C_1$ to $C_6$ alkyl group; an aryl group; a $C_2$ to $C_6$ alkene group; a $C_2$ to $C_6$ alkyne group; or any combination thereof.

9. The laundry care or dish care composition according to claim 1, wherein the composition is in the form of a liquid, a gel, a powder, a hydrocolloid, an aqueous solution, a granule, a tablet, a capsule, a single compartment sachet, a pad, a multi-compartment sachet, a single compartment pouch, or a multi-compartment pouch.

10. The laundry care or dish care composition according to claim 1, wherein the composition further comprising an ingredient selected from: surfactant, an enzyme, a detergent builder, a complexing agent, a polymer, a soil release polymer, a surfactancy-boosting polymer, a bleaching agent, a bleach activator, a bleaching catalyst, a fabric conditioner, a clay, a foam booster, a suds suppressor, an anti-corrosion agent, a soil-suspending agent, an anti-soil re-deposition agent, a dye, a bactericide, a tarnish inhibitor, an optical brightener, a perfume, a saturated or unsaturated fatty acid, a dye transfer-inhibiting agent, a chelating agent, a hueing dye, a calcium cation, a magnesium cation, a visual signaling ingredient, an anti-foam, a structurant, a thickener, an anti-caking agent, a starch, sand, a gelling agent, or any combination thereof.

11. The laundry care or dish care composition according to claim 1, wherein the composition comprises an enzyme selected from: a cellulase, a protease, an amylase, a lipase, or any combination thereof.

12. The laundry care or dish care composition according to claim 1, wherein the poly alpha-1,6-glucan backbone of glucose monomer units, wherein at least about 90% of the glucose monomer units are linked via alpha-1,6 glycosidic linkages.

13. The laundry care or dish care composition according to claim 12, wherein from about 10% or less of the glucose monomer units are linked via alpha-1,3 glycosidic linkages.

* * * * *